(12) United States Patent
Haynes et al.

(10) Patent No.: US 11,089,788 B2
(45) Date of Patent: Aug. 17, 2021

(54) ENZYMATIC BRAN AND GERM FLAVOR AND TEXTURE IMPROVEMENT

(71) Applicant: Intercontinental Great Brands LLC, East Hanover, NJ (US)

(72) Inventors: Lynn C. Haynes, East Hanover, NJ (US); Bin Zhao, East Hanover, NJ (US); Daniel R. Schuenzel, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 145 days.

(21) Appl. No.: 15/534,193

(22) PCT Filed: Dec. 28, 2015

(86) PCT No.: PCT/US2015/067666
§ 371 (c)(1),
(2) Date: Jun. 8, 2017

(87) PCT Pub. No.: WO2016/109422
PCT Pub. Date: Jul. 7, 2016

(65) Prior Publication Data
US 2017/0360053 A1 Dec. 21, 2017

Related U.S. Application Data

(60) Provisional application No. 62/097,509, filed on Dec. 29, 2014.

(51) Int. Cl.
*A21D 13/02* (2006.01)
*A21D 8/04* (2006.01)
(Continued)

(52) U.S. Cl.
CPC .............. *A21D 13/02* (2013.01); *A21D 6/003* (2013.01); *A21D 8/042* (2013.01); *A23L 7/107* (2016.08);
(Continued)

(58) Field of Classification Search
CPC ........ A21D 13/02; A21D 8/042; A21D 6/003; A23L 7/115; A23L 7/107
(Continued)

(56) References Cited

U.S. PATENT DOCUMENTS

| | | |
|---|---|---|
| 5,200,215 A | 4/1993 | Slade |
| 5,622,738 A | 4/1997 | Takeuchi |

(Continued)

FOREIGN PATENT DOCUMENTS

| | | |
|---|---|---|
| CN | 103547171 | 1/2014 |
| CN | 103702566 | 4/2014 |

(Continued)

OTHER PUBLICATIONS

Zhang, L. 2010. Improving dietary fiber quality and application properties of wheat bran. (Thesis for M.S. degree) (Year: 2010).*
(Continued)

*Primary Examiner* — Hamid R Badr
(74) *Attorney, Agent, or Firm* — Fitch, Even, Tabin & Flannery LLP

(57) ABSTRACT

The texture and flavor of bran and germ for the production of whole wheat flour and for the production of baked goods containing whole wheat flour is improved by treating bran and germ with water and an enzyme composition comprising xyanase, pentosanase, or mixtures thereof to hydrate the bran and germ and to enzymatically convert insoluble fiber of the bran and germ into soluble fiber and sugars. The enzymatic conversion is conducted so as to decrease the water holding capacity of the bran and germ and provides a
(Continued)

bran and germ product having reduced grittiness and a reduced whole wheat flavor, while avoiding adverse effects on baking functionality. The enzymatic treatment with the xylanase and/or pentosanase may be initiated upon whole wheat berries or grains during tempering or it may be initiated upon a separated bran and germ fraction obtained after grinding or milling of whole wheat berries or grains.

18 Claims, 3 Drawing Sheets

(51) Int. Cl.
    *A23L 7/104*     (2016.01)
    *A23L 7/10*     (2016.01)
    *A21D 6/00*     (2006.01)

(52) U.S. Cl.
    CPC ........... *A23L 7/115* (2016.08); *A23V 2002/00* (2013.01); *A23V 2300/24* (2013.01); *A23V 2300/50* (2013.01)

(58) Field of Classification Search
    USPC ........................................................ 426/622
    See application file for complete search history.

(56) References Cited

U.S. PATENT DOCUMENTS

| | | |
|---|---|---|
| 6,899,910 B2 | 5/2005 | Johnston |
| 7,014,875 B2 | 3/2006 | Rubio |
| 7,258,888 B2 | 8/2007 | Dreese |
| 7,459,174 B2 | 12/2008 | Rubio |
| 7,709,033 B2 | 5/2010 | Kvist |
| 8,029,843 B2 | 10/2011 | Bohm |
| 8,133,527 B2 | 3/2012 | Haynes |
| 8,173,193 B2 | 5/2012 | Haynes |
| 2003/0059496 A1 | 3/2003 | Rubio |
| 2003/0082290 A1 | 5/2003 | Dull |
| 2005/0089602 A1 | 4/2005 | Kvist |
| 2005/0136173 A1 | 6/2005 | Korolchuk |
| 2006/0073258 A1 | 4/2006 | Korolchuk |
| 2006/0275536 A1 | 12/2006 | Reid |
| 2007/0269579 A1 | 11/2007 | Mingus |
| 2007/0292583 A1 | 12/2007 | Haynes |
| 2008/0171114 A1* | 7/2008 | Castillo Rodriguez ............. A21D 13/02 426/231 |
| 2009/0238935 A1 | 9/2009 | Haynes |
| 2010/0035302 A1* | 2/2010 | Broekaert ............ C12P 7/10 435/72 |
| 2011/0065666 A1 | 3/2011 | Lehtomaki |
| 2011/0274786 A1 | 11/2011 | Sorensen |
| 2012/0003690 A1 | 1/2012 | Sorensen |
| 2013/0045304 A1 | 2/2013 | Sorensen |
| 2013/0137147 A1 | 5/2013 | Lali |

FOREIGN PATENT DOCUMENTS

| | | |
|---|---|---|
| EP | 1553849 | 7/2005 |
| EP | 2168445 | 3/2010 |
| WO | 99021656 | 5/1999 |
| WO | 03105601 | 12/2003 |
| WO | 2007106941 | 9/2007 |
| WO | 2007149320 | 12/2007 |
| WO | 2008132238 | 11/2008 |
| WO | 2009109703 | 9/2009 |
| WO | 2009158588 | 12/2009 |
| WO | 2010081870 | 7/2010 |
| WO | 2011124678 | 10/2011 |
| WO | 2012130969 | 10/2012 |
| WO | 2012142399 | 10/2012 |
| WO | 2012148543 | 11/2012 |
| WO | 2014149810 | 9/2014 |

OTHER PUBLICATIONS

Noort, M. W. J. et al., J. Cereal Sci. 52: 59-64 (2010) (Year: 2010).*
International Search Report, dated Mar. 14, 2016 for Iternational Application No. PCT/US2015/067666 (4 pgs.).
Ozkan Koyuncu et al: "Effect of Pentosanase on Dough and Bread Properties Produced by Different Types of Flours," Journal of Food Quality, vol. 31, No. 2, Apr. 1, 2008 (17 pgs.).
Written Opinion fo the International Searching Authority for Iternational Application No. PCT/US2015/067666 (7 pgs.).
Atwell et al., "The Terminology and Methodology Associated With Basic Starch Phenomena," Cereal Foods World, vol. 33., No. 3, pp. 306-311, Mar. 1988.
Guo Shihua, "Molecular Marker and Improvement of Wheat Quality", China Agriculture Press, the first edition, pp. 381-382, 2006.
He Guoqing et.al., "Food microbiology", China Agricultural University Press, the second edition, pp. 243-244, 2009.
International Preliminary Report on Patentability, dated Jul. 13, 2017 for International Application No. PCT/US2015/067666 (9 pgs.).
Zong Wei, "Food Industry Technology", Northeast Forestry University Press, the first edition, pp. 37-38, 2006.
Office Action for European Application No. 15823905.3 dated Feb. 8, 2019, pp. 1-7.
Office Action for Chinese Application No. 201580070880.2 dated Feb. 3, 2020, pp. 1-21.
Zhang Chenglong, "Study on Quality Improvement of Whole Wheat Flour," China Master's Theses Full-text Database (Electronic Journal), Engineering Technologies, vol. I, Issue 5, pp. B024-211, 2014.
Wang Li, "Study on Preparation of High-quality Wheat Bran Dietary Fiber and their Monosaccharide Compositions and Properties", China Master's Theses Full-text Database (Electronic Journal), Engineering Technologies, vol. I, Issue 2, pp. B024-7, 2010.
Office Action for Chinese Application No. 201580070880.2 dated Nov. 3, 2020.
Office Action for Chinese Application No. 201580070880.2 dated Apr. 2, 2021.

* cited by examiner

ENZYMATIC BRAN AND GERM FLAVOR AND TEXTURE IMPROVEMENT

CROSS REFERENCE TO RELATED APPLICATIONS

This application is a U.S. national phase application of International Application No. PCT/US2015/067666, filed Dec. 28, 2015, which claims the benefit of U.S. Provisional Application 62/097,509, filed Dec. 29, 2014, which are hereby incorporated herein by reference in their entirety.

FIELD

The present invention relates to continuous processes for improving the flavor and texture of bran and germ components or ingredients which may be used for making stabilized whole grain flours. The present invention also relates to food products, such as baked goods made from the improved bran components and whole grain flours having superior texture and flavor.

BACKGROUND

Food products containing elevated levels of whole grain are recommended by the 2010 dietary guidelines published by the USDA because whole grains are a good source of nutrients of concern. For adults, these nutrients include calcium, potassium, fiber, magnesium, and vitamins A (as carotenoids), C, and E. However, consumption of whole grain foods has lagged mainly due to certain qualities of whole grain foods, such as coarse, gritty appearance and texture from the whole grain flour ingredient typically available for use. More recently, commercial whole grain wheat flours are marketed with reduced particle size. However, baked goods made from the whole grain flours still exhibit a dry, grainy mouth-feel and a "wheaty," grainy, or hay taste or flavor, and low amounts of brown, caramelized baked flavor.

Steam or other heat sources are used to inactivate enzymes such as lipase and lipoxygenase in whole grains. Inactivation of lipase or lipoxygenase may also be achieved by heating a bran fraction or bran component to obtain a stabilized bran component and then combining the stabilized bran component with an endosperm fraction or component to obtain a stabilized whole grain flour. However, heating of whole grains or a bran fraction or bran component to inactivate enzymes does not assure elimination of a wheaty, grainy taste and attainment of improved texture and flavor in baked goods. Also, heating of whole grains to inactivate enzymes to obtain a stabilized whole grain flour can result in excessive gelatinization of starch or may denature proteins and adversely affect gluten network development. The excessive gelatinization or interruption of gluten network production can adversely affect dough machinability, and flour functionality in baked goods such as cookies and crackers in terms of solvent retention capacity and oven spread.

U.S. Pat. No. 5,200,215 to Slade et al discloses that low moisture content comestibles having reduced water regain or increased tolerance to moisture are produced by enzymatically treating a farinaceous material with an enzyme composition comprising pentosanase or beta-glucanase, or mixtures thereof to reduce its net-work forming swellable water-soluble hemicellulose content.

U.S. Pat. No. 5,622,738 to Takeuchi et al discloses a method of preparing a water-soluble dietary fiber, comprising the steps of: (a) treating a vegetable fiber material, such as corn hulls, rice bran, wheat bran, barley bran, malt roots, and wood with an alkali, (b) extracting from the treated material from step (a) only a liquid component and (c) treating said liquid component with an alkaline xylanase.

U.S. Pat. No. 6,899,910 to Johnston et al discloses a process for recovering corn germ and corn coarse fiber from corn in a dry grind process, involving soaking corn kernels in water to produce soaked corn kernels, grinding the soaked corn kernels to produce a ground corn slurry, and incubating the ground corn slurry with at least one enzyme (amylase(s), protease(s), cell wall degrading enzyme(s), or mixtures thereof, at a temperature of about 25° C. to about 70° C., and optionally other enzyme(s)) to increase the specific gravity of the slurry to about 10-about 16 Baume so that the corn germ and corn coarse fiber floats to the top of the slurry.

U.S. Pat. No. 7,014,875 to Rubio et al discloses production of precooked and partially debranned corn flour, comprising the steps of: precooking cleaned corn kernels with steep-water heated from a downstream wet conditioner to form a suspension of corn and water, precooking the corn kernel at a near neutral-pH with a solution comprising at least one enzyme selected from the group consisting of an endoxylanase and an endoamylase, at a temperature of from 50° C. to 70° C. to effect a partial hydrolysis of bran heteroxylans and starchy cell-walls during precooking.

U.S. Pat. No. 7,459,174 to Rubio discloses production of precooked and partially-debranned corn flour by an enzymatic precooking using a commercial blend of xylanase, endoamylase and endoprotease as a processing aid. The low-temperature and neutral-pH precooking with an endoenzyme solution is conducted at a temperature of 50° C. to 70° C. and effects a partial bran hydrolysis while avoiding excessive pregelatinization, reduced washing and corn solid loss in wastewater. Moisture content is then stabilized, followed by milling and drying at a high-temperature and short-time to produce a controlled gelatinization and denaturation in the ground kernel, cooling and further drying the dried-ground particle.

U.S. Pat. No. 7,709,033 to Kvist et al discloses a two-step process for the fractionation of valuable fractions from cereal brans (e.g. wheat, barley and oat brans, and rice polish). The bran is first subjected to a combination of enzymatic treatment and wet milling, followed by sequential centrifugation and ultrafiltration, which aims at physically separating the main bran fractions, i.e. insoluble phase (pericarp and aleurone layer), germ-rich fraction, residual endosperm fraction and soluble sugars. A second step consists of fractionating cereal brans substantially free of soluble compounds, hence an insoluble phase from the above-mentioned first step, by enzymatic treatment with xylanases and/or beta-glucanase and wet milling, followed by sequential centrifugation and ultrafiltration, which aims at physically separating the main fractions, i.e. insoluble phase (remaining cell wall components), protein-rich fraction, soluble hemicellulose and oligosaccharide, and therefore maximizes the extraction rate of valuable cell wall components and aleurone cells from previously cleaned bran.

U.S. Pat. No. 8,029,843 to Bohm et al discloses a method for the preparation of aleurone from wheat bran, by biochemical/enzymatic means and/or by mechanical-abrasive means. The subsequent isolation and extraction can be achieved by wet and/or dry separating methods. Wheat bran with a size distribution of 400-800µ may be mixed with water and stirred at a temperature of 45-55° C., and an enzyme solution (xylanase) is added to weaken the adhesive forces between the seed coat and the aleurone cell layer, resulting in the separation of the two layers adhering to one another.

U.S. 2003/0059496 and EP 1553849 each to Rubio et al disclose a method of improving the textural properties of corn packaged-tortilla by: a) combining nixtamalized corn flour with an effective amount of a xylanase, b) mixing the instant masa flour, water and xylanase to form a suitable corn-dough texture, and c) baking the corn-dough to partially hydrolyze insoluble heteroxylans from endosperm, germ and pericarp or bran cell-walls during tortilla making, at a temperature up to the xylanase denaturing temperature.

U.S. 2003/0082290 to Dull discloses a method of stabilizing bran comprising: (a) adding an amount of bran to an amount of water to form a hydrated bran composition; (b) heating said bran composition to between about 40° F. and 211° F.; (c) adding an amount of base to said bran composition in an amount sufficient to have an initial pH ranging between about 7.5 and about 14.0, with said base contacting said bran composition for between about 0.1 minutes and about 90 minutes to thereby saponify fats in said bran; and, (d) separating the remaining water from said bran. After processing, proteases, xylanases, or other enzymes may be added to the bran.

U.S. 2006/0275536 to Reid et al discloses a method for hydrolysis of a grain product to increase soluble fiber content by mixing at high shear a mixture comprising a grain product with dietary fiber, a base and water at a pH from about 10 to about 13 to form a homogenous mixture that hydrolyzes following heating with respect to the insoluble fiber. According to Reid et al, through the treatment of wheat bran with enzymes (cellulases and xylanases) the soluble fiber content can be increased to twice ("2x") its native level to approximately 4.4% on a dry weight basis. However, more significant improvement in increasing the soluble fiber content can be obtained by treatment of a high fiber starting material with water and alkali.

U.S. 2011/0065666 and WO 2009/109703 to Lekomaki et al disclose a method of manufacturing a cereal bran product containing beta-glucan where a plastic mass is formed from cereal bran by thermo-mechanical treatment at a temperature of 40-70° C., and the mass is brought into contact with an enzyme that breaks up beta-glucan (e.g., cellulase, hemicellulase, xylanase), with or without an enzyme that breaks up starch. After inactivating the enzyme, the bran is dried and, when so needed, ground. The cereal bran product manufactured according to the method has an essentially inextensible structure in a water environment.

U.S. 2011/0274786 and WO 2010/081870 each to Sorensen et al disclose a method for the solubilization of a cereal bran comprising starch, by: a) preparing a liquid suspension of particulate cereal bran containing substantial amounts of starch; b) treating said particulate cereal bran containing substantial amounts of starch in liquid suspension sequentially in any order without the removal of any components or simultaneously with: one or more cell-wall modifying enzyme; such as xylanase, one or more starch modifying enzyme; and optionally one or more further enzyme. It is disclosed that a degree of solubilization of the bran fraction may vary from 10 to 25% solubilization.

U.S. 2012/0003690 to Sorensen et al discloses a method for the treatment of lipid-containing plant material by treating a liquid suspension of an at least partly solubilized lipid-containing plant material with one or more lipid modifying enzyme. Treatment to obtain an at least partly solubilized plant material may be a treatment with one or more cell-wall modifying enzyme, such as xylanase. In the protocol for bran modification, enzymes are added and reaction is continued at 50° C.

U.S. 2013/0045304 and WO 2011/124678 each to Sorensen disclose a method for increasing the water holding capacity (WHC) of a cereal bran fraction by: a) Addition of water to a particulate cereal bran fraction to obtain a water content lower than 100% (w/w); b) Treating said particulate cereal bran fraction with added water with: one or more cell-wall modifying enzyme; such as a xylanase, and optionally simultaneously or sequentially in any order treating said particulate cereal bran fraction with one or more further enzyme. The cereal bran fraction may be further treated in a heat treatment for a period of time to inactivate further enzyme activity and/or to gelatinize any residual starch, and/or to increase the WHC further. The heat treatment may be at a temperature in the range of 40-300° C., such as in the range of 60-90° C.

U.S. 2013/0137147 to Lali et al discloses production of fermentable sugars from hemicellulose using a multi-step multi-enzyme system, comprising: a) treating hemicellulose with at least one of endo-xylanases and exo-xylanase enzyme at a temperature ranging from 30° C. to 90° C. to obtain a hydrolyzate; and b) separating the hydrolyzate from the endo-xylanases and exo-xylanase enzyme to obtain a solution comprising oligosaccharides and monosugars; and c) treating the solution with xylosidase to obtain the fermentable sugars. The biomass may be trees, shrubs and grasses, wheat, wheat straw, sugar cane bagasse, corn, corn stover, corn kernel including fiber from kernels, products and by-products from milling of grains such as corn, rye, oat bran, wheat and barley (including wet milling and dry milling) as well as municipal solid waste, waste paper and yard waste.

WO 99/21656 to Martinez et al discloses that by the addition of enzyme(s) the efficiency of the conditioning process for the treatment of grain, preferably wheat, prior to milling can be substantially improved thereby providing for a substantial increase in the yield of flour, and/or reduction of the conditioning time, and/or improvement of the rheological properties of the flour/bran produced. The enzyme preparation comprises at least one enzyme activity selected from the group comprising proteases, cellulases, pectinases, hemicellulases, xylanases, glucanases, β-glucanases, glucose oxidase, laccase and amylases. The treatment is performed at a temperature between 5° C. and 60° C.

WO 2007/106941 to Southan et al discloses treating a crop kernel prior to milling to improve millability, which includes the step of exposing the crop kernel, such as wheat, to one or more plant hormones elected from the group consisting of auxins, gibberellins and abscisic acid. The method further includes the step of exposing the crop kernel to an enzyme, typically a plant cell-wall degrading enzyme such as xylanase, lipase and cellulase. Also provided are methods of production of flour, food products and compositions. A particular application of this method is the optimization of milling performance for the production of high quality flour. The crop kernel may be treated for a period between 1 and 24 hours.

WO 2008/132238 to Gutierrez et al discloses that by the addition of highly concentrated xylanase enzyme(s) the efficiency of the conditioning process for the treatment of grain prior to milling is substantially improved, thereby providing for a substantial increase in the yield of flour, and/or reduction of the conditioning time, and/or improvement of the rheological properties of the flour/bran produced. The grain may be treated for a period of time from 1-48 hours at a temperature between 5° C. and 60° C.

WO 2009/158588 to Rubio et al discloses the continuous production of masa and whole-corn flours by combining a fine grind fraction of corn kernel with at least one endo-amylase and endoxylanase to produce an enzyme-added fine grind; moist-heat precooking the enzyme-added fine grind at a temperature of 100° C. to 170° C. to effect a partial starch gelatinization and protein denaturation and obtain a precooked enzyme-added fine grind; high-solid conditioning the precooked enzyme-added fine grind to partially hydrolyze starchy endosperm and bran granules to produce enzymatically conditioned corn kernel particles; and milling the conditioned corn kernel particles to obtain flour comprising a fine grind portion of the conditioned corn kernel particles.

WO 2012/130969 to Tripathy et al discloses production of a baked product by mixing flour, water, a glucose oxidase, and xylanase to obtain a dough, laminating the dough, and baking the dough.

EP 2168445 to Arlotti et al discloses the treatment of bran to obtain a dietary fiber composition having an increased soluble fiber content, by subjecting the bran to solubilization in the presence of an enzymatic mixture obtained from a culture of a *Trichoderma* strain, said culture being incubated on a substrate containing at least 1% (w/v) of bran in conditions suitable for the production of lytic enzymes. The bran contained in the substrate may be the same as the bran subjected to solubilization, and it may be durum wheat bran. The enzymatic mixture may contain enzymes chosen from the group which comprises glucanases, xylanases, chitinases and cellulases, preferably endoglucanases and endoxylanases. The solubilization step comprises the incubation, at a temperature between 20 and 30° C. for 12-60 hours, of a reaction mixture comprising bran dispersed in distilled water.

However, it has been found that enzymatic treatment of bran which converts insoluble fiber to water soluble fiber and increases the water holding capacity of bran or flours containing the treated bran adversely affects baking functionality of the flour in terms of dough machinability, oven spread, bake time, texture, and color.

Accordingly, there is a long felt need for a method of producing bran and germ components and whole grain flours which do not exhibit a wheaty or raw taste, or a rancid taste or odor, but which exhibit a buttery, nutty caramelized taste and non-gritty texture, and excellent dough machinability and baking functionality, without substantial interruption of gluten network production, as well as stabilization against enzymatic degradation.

SUMMARY

In an embodiment, the texture and flavor of bran and germ are improved for the production of whole wheat flour and baked goods containing whole wheat flour by treating bran and germ at a temperature of about 10° C. to about 95° C., more preferably from about 70° C. to about 90° C., most preferably from about 80° C. to about 85° C., with water and an enzyme composition containing a xylanase and/or a pentosanase. The treatment hydrates the bran and germ and enzymatically converts insoluble fiber of the bran and germ into soluble fiber and sugars. The treatment is conducted to reduce the water holding capacity or solvent retention capacity (SRC) of the bran and germ and whole grain flours containing the enzymatically treated bran and germ. The enzymatic treatment may increase water extractable arabinoxylans content of the bran and germ to about 1% by weight to about 10% by weight, based upon the weight of the bran and germ. The enzymatic treatment may be conducted to avoid substantial gelatinization of starch in the bran and germ. The enzymatic treatment results in bran and germ, and whole grain flours containing the bran and germ, having reduced grittiness and a reduced whole wheat flavor. The enzymatically produced sugars aid in the improved flavor and texture developed during and after baking and add solvent towards the reduction in the amount of water needed to make a dough. The enzymatic treatment which reduces, rather than increases, the water holding capacity of the bran and germ and whole grain flour containing it, provides excellent dough machinability and baking functionality, such as oven spread, color, texture, and baking times without substantial interruption of gluten network production. The enzymatically treated bran and germ and whole grain flours and baked goods containing the bran and germ do not exhibit a wheaty or raw taste, or a rancid taste or odor, but exhibit a buttery, nutty caramelized taste and non-gritty texture.

In an embodiment, the treatment of the bran and germ with the water and the enzyme composition may include tempering whole wheat kernels or grains in the water which contains the enzyme composition to hydrate the bran and germ, coat the kernels or grains with the enzyme composition, and enzymatically convert insoluble fiber of the bran and germ. The hydration with the enzyme composition of the whole grains during tempering, concentrates the enzyme in the bran and germ rather than in the endosperm of the whole grains. The tempered, coated wheat kernels may be ground to obtain a ground bran and germ fraction containing the xylanase and/or pentosanase enzyme concentrated therein, and which is separated from the endosperm fraction, which does not contain substantial, if any xylanase and/or pentosanase. The ground bran and germ fraction may be subjected to further enzymatic treatment with the enzyme composition, without enzymatic treatment of the endosperm fraction. The further enzymatic treatment may take place during storage or lay time, may be performed in a hydration operation or during stabilization with or without heat to inactivate lipase, or by combinations thereof. A whole grain flour having reduced grittiness and reduced whole wheat flavor may be obtained by combining the enzymatically treated bran and germ fraction with the endosperm fraction.

In another embodiment, a ground bran and germ fraction may be hydrated with water and the enzyme composition, and the hydrated ground bran and germ fraction may be subjected to the enzymatic treatment. The ground bran and germ fraction may be obtained without tempering of the whole grains or without enzymatic treatment of the whole grains during tempering. The hydration with the enzyme composition of the ground bran and germ fraction, but not the endosperm fraction, concentrates the enzyme in the bran and germ fraction of the whole grains. Further enzymatic treatment of the hydrated bran and germ fraction may take place during storage or lay time, or may be performed during stabilization with or without heat to inactivate lipase, or by combinations thereof. A whole grain flour having reduced grittiness and reduced whole wheat flavor may be obtained by combining the enzymatically treated bran and germ fraction with the endosperm fraction.

The water holding capacity or solvent retention capacity (SRC water) of the bran and germ may be reduced to less than about 80, preferably less than about 75, more preferably less than about 70, and the water holding capacity or solvent retention capacity (SRC water) of the whole wheat flour may be reduced to less than about 75, preferably less than about 65, more preferably less than about 60, by the enzymatic treatment. In embodiments, the water holding capacity or solvent retention capacity (SRC sucrose) of the bran and germ may be reduced to less than about 80, preferably less than about 75, more preferably less than about 70, and the water holding capacity or solvent retention capacity (SRC sucrose) of the whole wheat flour may be reduced to less than about 75, preferably less than about 70, more preferably less than about 65, by the enzymatic treatment.

In preferred embodiments of the invention, a whole wheat flour is provided having reduced grittiness and a reduced whole wheat flavor which includes a heat stable xylanase-treated and/or pentosanase-treated bran and germ fraction which comprises water soluble fiber, xylose, and arabinose, and an endosperm fraction which is not enzymatically treated, the whole wheat flour having a water holding capacity or solvent retention capacity (SRC water) of less than about 60, and a degree of starch gelatinization of less than 25% as measured by differential scanning calorimetry (DSC).

DETAILED DESCRIPTION

Figure 1:
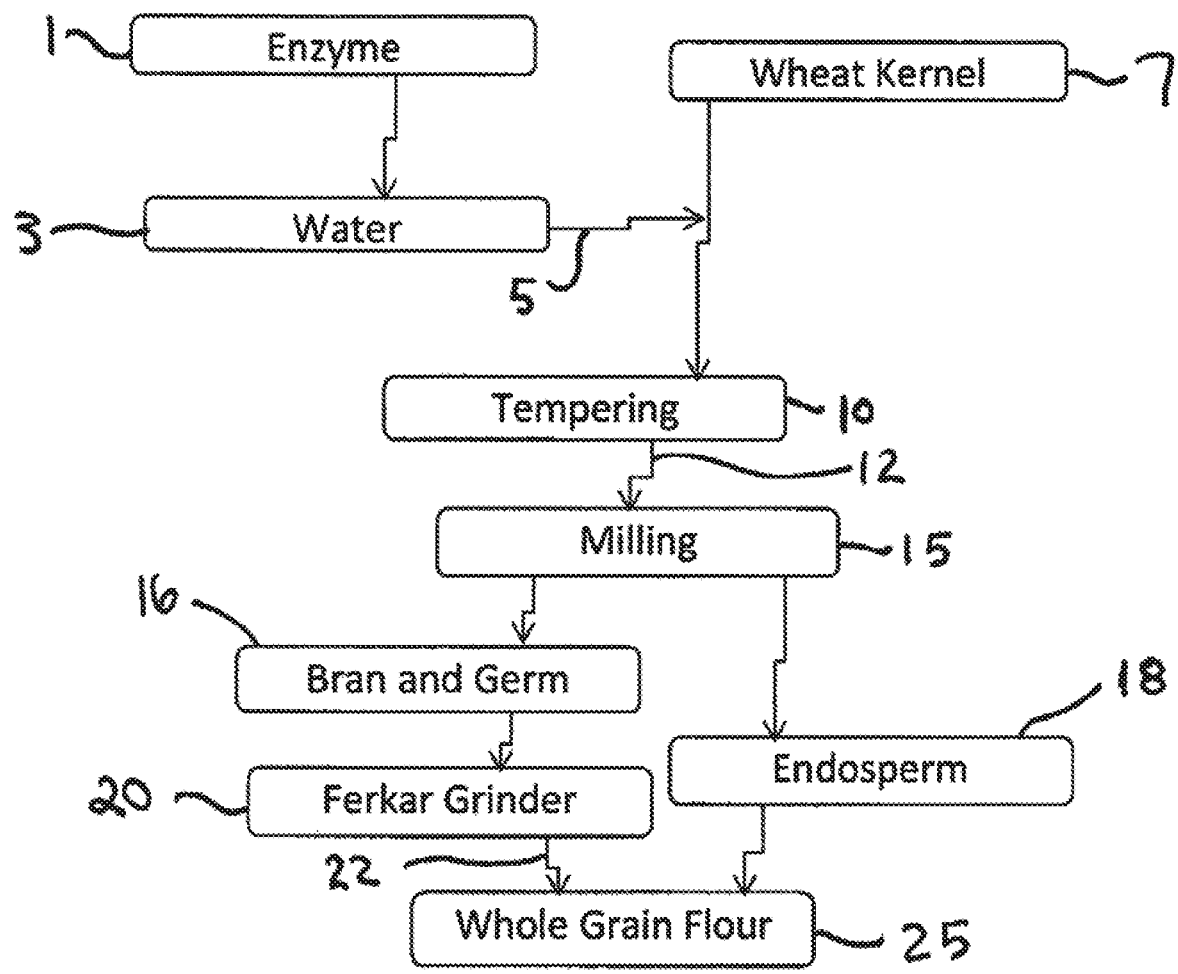
FIG. 1 shows a flow chart for the production of whole grain flour using xylanase and/or pentosanase enzymatic treatment initiated during tempering of the whole grains.

Reference now will be made to certain detailed aspects of various embodiments of the invention. It is to be understood that the disclosed embodiments are merely exemplary of the invention that may be embodied in numerous and alternative forms. Therefore, specific details disclosed herein are not to be interpreted as limiting, but merely as a representative basis for any aspect of the invention and/or as a representative basis for teaching one skilled in the art to variously employ the invention.

Except in the examples, or where otherwise expressly indicated, all numerical quantities in this description indicating amounts of material and/or use are to be understood as modified by the word "about" in describing the broadest scope of the invention. Practice within the numerical limits stated is generally preferred.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

The term "whole grain" includes the grain in its entirety, for example as a wheat berry or kernel, prior to any processing. As indicated in the U.S. Food and Drug Administration (FDA) Feb. 15, 2006 draft guidance and as used herein, the term "whole grain" includes cereal grains that consist of the intact, ground, cracked or flaked fruit of the grains whose principal components—the starchy endosperm, germ and bran—are present in the same relative proportions as they exist in the intact grain. The FDA outlined that such grains may include barley, buckwheat, bulgur, corn, millet, flee, rye, oats, sorghum, wheat and wild rice.

The term "refined wheat flour product" is a wheat flour that meets the FDA standards for a refined wheat flour product of a particle size in which not less than 98% passes through a U.S. Wire 70 sieve (210 microns).

The term "milling" as used herein includes the steps of rolling, breaking sifting and sorting the whole grain to separate it into its constituent parts, which may also result in some reduction of particle size of the constituent parts.

The term "grinding" as used herein includes any process directed to reducing particle size, including but not limited to colliding particles against one another or mechanically reducing the particle size.

The term "tempering" as used herein is the process of adding water to wheat before milling to toughen the bran and mellow the endosperm of the kernel and thus improve flour separation efficiency.

The term "hydration" or "post-hydration" as used herein refers to the step of adjusting hydration prior to milling or grinding, such as during tempering or by spraying whole berries or grains, or post-milling or post-grinding to adjust the moisture content of an individual constituent and/or to adjust the moisture content of the final flour.

Also, as used herein, lipase or enzyme "inhibition" means that the lipase or enzyme is no longer producing its enzyme product or has substantially reduced the production of its enzyme product. The term "inhibition" as used herein further includes lipase inactivation, wherein the lipase or enzyme is inactivated or substantially inactivated. For example, lipase inhibition means that the lipase enzyme is not hydrolyzing the triglycerides and releasing free fatty acids in the flour. The inhibition or ability of the enzyme to produce its enzyme product may be reversible or irreversible. For example, heating of an enzyme to denature the enzyme may irreversibly inactivate the enzyme. Treatment with an enzyme inhibitor may reversibly or irreversibly inactivate an enzyme. For example, acid treatment to inhibit lipase reduces production of the enzyme product, i.e. formation of free fatty acids. However, with reversible inhibition, there may still be extractable enzyme activity or measurable lipase activity. When extracting the enzyme to measure its activity, the inhibition to its activity may be removed by placing the enzyme into a higher pH environment where its activity is restored or reversed. Also, acid treatment may lower the pH to such an extent that the lipase inhibition is irreversible or the lipase inactivation is irreversible, so that there is both reduced formation of enzyme product and lower extractable enzyme activity.

The texture and flavor of bran and germ for the production of whole wheat flour and for the production of baked goods containing whole wheat flour is improved by treating bran and germ with water and an enzyme composition comprising xylanase, pentosanase, or mixtures thereof to hydrate the bran and germ and to enzymatically convert insoluble fiber of the bran and germ into soluble fiber and sugars. The enzymatic conversion is conducted so as to decrease the water holding capacity of the bran and germ and provides a bran and germ product having reduced grittiness and a reduced whole wheat flavor. Enzymatic treatment to produce soluble fiber where the water holding capacity increases instead of decreases, adversely affects baking functionality of the bran and germ and the whole grain flour containing it in terms of dough machinability, oven spread, bake time, texture, and color. Conducting the enzymatic treatment to produce soluble fiber, which in turn is partially enzymatically converted to sugars to a sufficient degree to reduce the water holding capacity, avoids these adverse effects on baking functionality. The sugars aid in the improved flavor and texture during baking and add solvent towards the reduction in the amount of water needed to make a dough. The bran and germ components and whole grain flours produced using the enzymatic treatment with xylanase and/or pentosanase do not exhibit a wheaty or raw taste, or a rancid taste or odor. The products exhibit a buttery, nutty caramelized taste and non-gritty texture, and excellent dough machinability and baking functionality, without substantial interruption of gluten network production, as well as stabilization against enzymatic degradation by lipase.

The enzymatic treatment with the xylanase and/or pentosanase may be initiated upon whole wheat berries or grains during tempering, or it may be initiated upon a separated bran and germ fraction obtained after grinding or milling of whole wheat berries or grains. The initiation of the enzymatic treatment is conducted with hydration of the whole grains during tempering or with hydration of the separated bran and germ fraction. The hydration with the enzyme during the initiation concentrates the enzyme in the bran and germ where it is needed to act upon the insoluble fiber, rather than acting upon the endosperm or starch. After hydration and initiation of the enzymatic treatment, the treatment may be permitted to continue, without inactivation of the enzymes, during subsequent stages, such as during stabilization to inactivate lipase, during storage, dough preparation and mixing, during laytime, dough machining, and dough transport to the baking ovens. The xylanase and/or pentosanase enzymes are inactivated during baking of the dough into baked goods. The enzymes are most active in the presence of water, such as during tempering, hydration, stabilization, and dough mixing, and are less active or may be dormant or inactive during low moisture content and low temperature conditions such as during storage of the bran and germ fraction, or during storage of the whole wheat flour.

As a result of the enzymatic treatment of the whole grains initiated during tempering, or as a result of the enzymatic treatment of the separated bran and germ fraction initiated during hydration or stabilization, the xylanase and/or pentosanase content of the bran and germ portion of the whole grains is increased and remains available for subsequent enzymatic activity to produce additional water soluble fiber and sugars. The subsequent enzymatic activity may take place during storage of the tempered whole grains, or storage of the bran and germ fraction, during dough production, and during baked good production. The xylanase and pentosanase enzymatic activity is generally highest in the presence of water, such as during tempering, hydration, or stabilization or steaming, as opposed to during storage at low moisture contents and low temperatures. Enzymatic activity is also generally higher in the subsequent operations, where additional water is added and present, such as during dough production and baked good production. Generally, xylanase and pentosanase enzymatic activity is substantially reduced or stopped by high temperatures, such as greater than or equal to 100° C., or temperatures reached during baking which inactivate the enzymes. Lipase is generally inactivated during the stabilization or steaming of the bran and germ fraction.

The enzyme composition may include any xylanase and/or pentosanase, such as those derived from *Trichoderma reesei*, which converts insoluble fiber of the bran and germ into water soluble fiber and sugars, such as xylose and arabinose. The enzyme composition preferably does not contain enzyme activity from amylases or proteases which would adversely affect starch in the endosperm, or proteins, such as gluten, in the flour. The enzymatic treatment of the bran and germ may be at a temperature of about 10° C. to about 95° C., more preferably from about 70° C. to about 90° C., most preferably from about 80° C. to about 85° C. The enzymatic heat treatment avoids substantial gelatinization of starch in the bran and germ.

In embodiments where heat stabilization is employed to reduce lipase activity, the xylanase and/or pentosanase enzyme composition employed may have a peak activity range which is compatible, close to, or overlaps with the heat stabilization temperatures and heat stabilization times employed. A heat stable xylanase alone, or a heat stable pentosanase alone is preferred over mixtures of a xylanase and pentosanase. A heat stable xylanase alone is most preferred. The xylanase employed may be a native xylanase, or a modified xylanase, such as a GMO xylanase, or a non-GMO xylanase, or mixtures thereof.

The enzyme composition preferably includes a stabilized liquid xylanase having a xylanase enzymatic activity of about 0.5 XU xylanase activity per gram flour to about 50 XU xylanase activity per gram flour, and preferably does not contain enzyme activity from amylases or proteases which would adversely affect starch in the endosperm, or proteins, such as gluten, in the flour. In preferred embodiments, the enzymatic treatment of the bran and germ with the water and the xylanase enzyme composition may be conducted at a temperature of about 65° C. to about 95° C., for example from about 70° C. to about 93° C., more preferably from about 70° C. to about 90° C., for example from about 75° C. to about 87° C., most preferably from about 80° C. to about 85° C. with a heat stable xylanase having a xylanase enzymatic activity of about 0.5 XU xylanase activity per gram flour to about 50 XU xylanase activity per gram flour.

Exemplary of xylanases which may be employed in the enzymatic treatment are disclosed in U.S. Pat. No. 7,510,860 to Sung, and U.S. Pat. No. 7,691,609 to White et al, the disclosures of which are each herein incorporated by reference in their entireties. The xylanases disclosed by White et al which may be employed include a xylanase, or a modified xylanase enzyme comprising at least one substituted amino acid residue at a position selected from the group consisting of amino acid 11, 116, 118, 144 and 161, the position determined from sequence alignment of the modified xylanase with *Trichoderma reesei* xylanase II amino acid sequence. According to Sung the xylanases exhibit improved thermophilicity, alkalophilicity, expression efficiency, or a combination thereof, in comparison to a corresponding native xylanase. The xylanases disclosed by White et al which may be used include modified Family 11 xylanase enzymes comprising a sequence that introduces a functional consensus glycosylation site. Non-limiting examples of introduced glycosylation sites include mutation of the amino acid at position 34, 131, 180, 182, or a combination thereof, to an asparagine. The indicated amino acid position in the Family 11 xylanase is determined from sequence alignment of the xylanase of interest with that of a *Trichoderma reesei* xylanase II amino acid sequence. According to White, the introduced consensus glycosylation site facilitates increased expression efficiency of the modified xylanase when compared to the expression efficiency of a corresponding xylanase from which the modified xylanase was derived, using similar host strains and growth conditions.

Commercially available xylanases which may be employed in embodiments include IOGEN DP-339, IOGEN DP-340, and IOGEN DP-341, manufactured by Iogen Corporation, Ottawa, Canada. IOGEN DP-339 is a stabilized liquid xylanase derived from *Trichoderma reesei* having a minimum xylanase (XU/g) of 24,000, generally measured at 25,300 XU/g, which is a high temperature tolerant xylanase enzyme with optimum conditions of 60° C. to 70° C., and pH 6-7 with a recommended test condition of 70° C. and pH of 6.5 and a recommended dosage range (g enzyme/T substrate) of 50 to 300. IOGEN DP-340 is a stabilized liquid xylanase derived from *Trichoderma reesei* having a minimum xylanase (XU/g) of 24,000, generally measured at 25,300 XU/g, which is a high temperature tolerant xylanase/hemicellulose/beta-glucanase enzyme blend with optimum conditions of 60° C. to 90° C., and pH 6-7 with a recommended test condition of 70° C. and pH of 6.5 and a recommended dosage range (g enzyme-T substrate) of 50 to 300. IOGEN DP-341 is a stabilized liquid xylanase derived from a non-GMO (non-genetically modified organism) *Trichoderma reesei* having a generally measured xylanase (XU/g) of 8,300, which is a xylanase/hemicellulose blend enzyme Non-GMO with optimum conditions of 50° C. to 60° C., and pH 4-6 with a recommended test condition of 60° C. and pH of 5.5 (or operate outside the optimum range and match the above conditions for direct comparison to other enzymes as a non-GMO option), and a recommended dosage range (g enzyme/T substrate) of 100 to 500.

In other embodiments, the enzymatic treatment of the bran and germ with the water and the pentosanase enzyme composition may be conducted at a temperature of about 65° C. to about 90° C., for example from about 70° C. to about 90° C., more preferably from about 70° C. to about 85° C., for example from about 75° C. to about 85° C., most preferably from about 80° C. to about 85° C. with a pentosanase having a xylanase enzymatic activity of about 0.5 XU xylanase activity per gram flour to about 50 XU xylanase activity per gram flour. While the literature indicates that 50° C. to 60° C. is optimal in a buffer at a Relative Humidity (RH) of 1.000, our testing with a pentosanase enzyme composition at 25° C. and 70° C. of the hydrolysis effect on pentosan in flour, at RH=0.65, as measured by SRC was greater at 70° C. than at 25° C., because, it is believed, the lower RH environment stabilizes the enzyme at higher temperatures.

A commercially available enzyme preparation which may be used in the present invention is PEN III Concentrate, manufactured by Kerry Food Ingredients, Ireland. It is believed to comprise endo-cellulase, beta-glucanase, pentosanase, and beta-glucosidase. According to Kerry Food Ingredients, optimal operating pH for the important activities in PEN III are generally centered around pH 5 to 6. It is indicated that considerable flexibility does exist. Typically, it is reported, pH adjustment is not required when treating cereal grains suspended in tap water (pH approximately 6.2). According to the literature, optimal activity is generally found at about 50° to 60° C. (122° to 140° F.). The enzymes, it is stated, are active at lower temperatures, but work less quickly. Higher temperatures (to approximately 70° C.) may be used for short incubation times but the activity is soon lost due to thermal inactivation.

In preferred embodiments, a commercially available enzyme composition, PEN III Concentrate, produced by Kerry Ingredients & Flavours, Beloit, Wis. may be employed. PEN III Concentrate is a xylanase enzyme system derived from a selected strain *Trichoderma reesei*. The xylanase is a pentosanase enzyme that hydrolyzes the beta 1,4 xylosidic bonds in the xylose polymer backbone of which pentosans are composed. The PEN HIII Concentrate may have a xylanase concentration of 9,500 to 11,000 u/ml. PEN III Concentrate has relative activity of about 30% at 30° C., a relative activity of about 20% at 70° C., and has a temperature optimum of 131° F. (55° C.) but can perform on a much broader range under the correct conditions of pH and incubation time. It is fully active between pH 3.0 and 7.0 with a peak activity at a pH of about 5-6. For a 30 minute holding time PEN III Concentrate has a peak relative stability at about 40° C. to 60° C., and a peak pH stability at a pH of about 3 to about 7.

In embodiments the texture and flavor of whole wheat flour and baked goods containing whole wheat flour may be improved by treating bran and germ at a temperature of about 10° C. to about 95° C., more preferably from about 70° C. to about 90° C., most preferably from about 80° C. to about 85° C., with water and an enzyme composition comprising a xylanase and/or a pentosanase. The enzymatic treatment hydrates the bran and germ and enzymatically converts insoluble fiber of the bran and germ into soluble fiber and sugars, and reduces the water holding capacity of the bran and germ. The enzymatically treated bran and germ may be combined with an endosperm fraction to obtain a whole wheat flour. The enzymatic treatment results in a whole wheat flour having reduced grittiness and a reduced whole wheat flavor.

In an embodiment, the texture and flavor of whole wheat flour and baked goods containing whole wheat flour may be improved by the treatment of the bran and germ with the water and the enzyme composition during tempering. Whole wheat kernels or grains may be tempered in the water and in the enzyme composition to hydrate the bran and germ, coat the kernels or grains with the enzyme composition, and enzymatically convert insoluble fiber of the bran and germ into soluble fiber and sugars. The tempered coated whole wheat kernels may then be ground to obtain a ground bran and germ fraction. The ground bran and germ fraction may be subjected to further enzymatic treatment with the enzyme composition before being combined with the endosperm fraction to obtain a whole wheat flour with improved texture and flavor.

In another embodiment, the texture and flavor of whole wheat flour and baked goods containing whole wheat flour may be improved by hydrating a ground bran and germ fraction with water and the enzyme composition, and the hydrated ground bran and germ fraction may be subjected to the enzymatic treatment. The enzymatically treated ground bran and fraction may be combined with the endosperm fraction which has not been enzymatically treated, to obtain a whole wheat flour with improved texture and flavor.

As shown schematically in FIG. 1, the treatment of the bran and germ with the water and the enzyme composition during tempering may include admixing the enzyme composition 1 with tempering water 3 to obtain a substantially homogeneous aqueous enzyme tempering composition 5, which is admixed with whole wheat berries or wheat kernels 7. The whole wheat kernels or grains 7 are subjected to tempering 10 in the tempering water 3 and in the enzyme composition 5 to: a) hydrate the bran and germ which are in the outer layer of the wheat kernels 7, b) coat the kernels or grains 7 with the enzyme composition 1, and c) enzymatically convert insoluble fiber of the bran and germ. The tempering may be conducted in conventional tempering vats, containing tempering water 3 and the wheat kernels 7, and the enzyme composition may be added to the water 3 in the tempering vats. In other embodiments, the enzyme composition 1 may be premixed with all or a portion of the tempering water to obtain an aqueous enzyme tempering composition 5 which is added to the tempering vats for admixture with the wheat kernels 7. The tempered coated wheat kernels 12 may be subjected to conventional milling 15 to obtain a bran and germ fraction 16, and a separated, endosperm fraction 18. The bran and germ fraction 16 may be subjected to further grinding 20 using a hammer mill, or preferably a Ferkar grinder or mill, which uses vertical aerodynamic striking, where material falls from above into the milling chamber where it is hit by a vertical rotor and goes out through screens. The ground bran and germ fraction 22 may be subjected to enzymatic treatment with the enzyme composition 1 during further processing and storage because the enzyme may remain active during tempering, milling, grinding, transport, and storage. The ground bran and germ fraction 22 may be combined with the endosperm fraction 18, which has not undergone enzymatic treatment with the enzyme composition 1, to obtain a whole grain wheat flour 25 having improved texture and flavor compared to whole wheat flour which is not subjected to the enzymatic treatment with the xylanase and/or pentosanase. The whole wheat flour 25 may undergo further enzymatic treatment by the xylanase and/or pentosanase during transport, storage, dough mixing and production, dough machining, and transport to the baking ovens where it is inactivated by baking. In embodiments, the enzymatically treated bran and germ fraction 22 or the whole grain wheat flour 25 may be inactivated with respect to the xylanase and/or pentosanase by subjection to inactivation temperatures and/or drying prior to baking.

In embodiments of the invention, the treatment of the bran and germ with the water and the enzyme may be conducted by hydrating a ground bran and germ fraction with water and the enzyme composition, and subjecting the hydrated ground bran and germ fraction to the enzymatic treatment with or without tempering of the whole grains or wheat kernels, and with or without stabilization of the bran and germ fraction.

Figure 2:
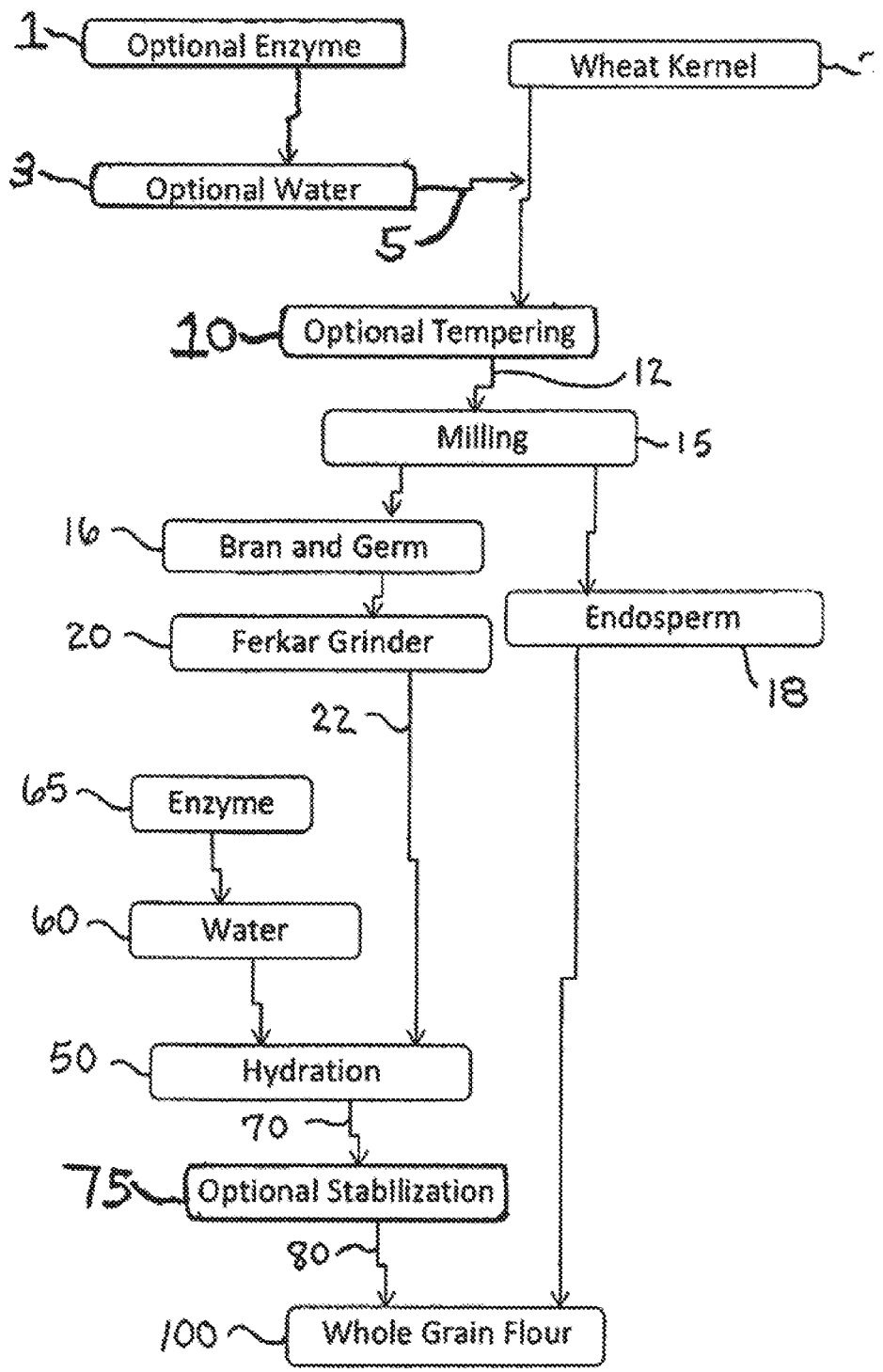
FIG. 2 shows a flow chart for the production of whole grain flour using xylanase and/or pentosanase enzymatic treatment initiated during hydration of a ground bran and germ fraction.

As shown in FIG. 2, the treatment of the bran and germ with the water and the enzyme composition during tempering may be optional, with enzymatic treatment being initiated or performed by hydrating a ground bran and germ fraction with water and the enzyme composition, and subjecting the hydrated ground bran and germ fraction to the enzymatic treatment of the bran and germ with the water and the enzyme composition. As shown schematically in FIG. 2, optionally, the enzyme composition 1 may be admixed with optional tempering water 3 to obtain an optional substantially homogeneous aqueous enzyme tempering composition 5, which is admixed with whole wheat berries or wheat kernels 7, as also shown in the embodiment of FIG. 1. The whole wheat kernels or grains 7 are optionally subjected to tempering 10 in the optional tempering water 3 and in the optional enzyme composition 5 to: a) hydrate the bran and germ which are in the outer layer of the wheat kernels 7, b) coat the kernels or grains 7 with the enzyme composition 1, and c) enzymatically convert insoluble fiber of the bran and germ. The tempering may be conducted in conventional tempering vats, containing optional tempering water 3 and the wheat kernels 7, and the optional enzyme composition may be added to the optional water 3 in the tempering vats. In other embodiments, the optional enzyme composition 1 may be premixed with all or a portion of the optional tempering water to obtain an optional aqueous enzyme tempering composition 5 which is added to the tempering vats for admixture with the wheat kernels 7. In embodiments, the wheat kernels 7 may be tempered 10 using the optional tempering water, without the addition of the optional enzyme composition 3, so that the tempering 10 is conducted without enzymatic treatment but is initiated later after milling upon the milled or ground bran and germ fraction.

As shown in FIG. 2, the optionally tempered coated wheat kernels 12 or untempered, non-enzymatically treated wheat kernels 7 may be subjected to conventional milling 15 to obtain a bran and germ fraction 16, and a separated, endosperm fraction 18. The bran and germ fraction 16 may be subjected to further grinding 20 using a hammer mill, or preferably a Ferkar grinder or mill. The ground bran and germ fraction 22 may be subjected to hydration 50 with water 60 for enzymatic treatment with the enzyme composition 65 to obtain a hydrated ground bran and germ fraction 70 which is subjected to the enzymatic treatment with the xylanase and/or pentosanase. The enzymatically treated hydrated ground bran and germ fraction 70 may be optionally subjected to stabilization 75, with or without heat, and with or without additional water, to inactivate lipase or reduce lipase activity and obtain an optionally stabilized, enzymatically treated, hydrated ground bran and germ fraction 80. The hydrated ground bran and germ fraction 70 may be subjected to enzymatic treatment with the enzyme composition 65 and the optional enzyme composition 1 during further processing and storage because the enzyme may remain active during optional tempering, milling, grinding, hydration, optional stabilization, transport, and storage. The enzymatically treated hydrated ground bran and germ fraction 70 or optionally stabilized, enzymatically treated hydrated ground bran and germ fraction 80 may be combined with the endosperm fraction 18, which has not undergone enzymatic treatment with the enzyme composition 1 and/or 65, to obtain an optionally stabilized, whole grain wheat flour 100 having improved texture and flavor compared to whole wheat flour which is not subjected to the enzymatic treatment with the xylanase and/or pentosanase. The optionally stabilized whole wheat flour 100 may undergo further enzymatic treatment by the xylanase and/or pentosanase during transport, storage, dough mixing and production, dough machining, and transport to the baking ovens where it is inactivated by baking. In embodiments, the enzymatically treated hydrated bran and germ fraction 70, or optionally stabilized, hydrated ground bran and germ fraction 80, or optionally stabilized whole grain wheat flour 100 may be inactivated with respect to the xylanase and/or pentosanase by subjection to inactivation temperatures and/or drying prior to baking.

The embodiments disclosed are applicable to any and all types of wheat. Although not limited thereto, the wheat berries may be selected from soft/soft and soft/hard wheat berries. They may comprise white or red wheat berries, hard wheat berries, soft wheat berries, winter wheat berries, spring wheat berries, durum wheat berries, or combinations thereof. Examples of other whole grains that may be processed in accordance with various or certain embodiments or aspects of this invention include, for example, oats, corn, rice, wild rice, rye, barley, buckwheat, bulgur, millet, sorghum, and the like, and mixtures of whole grains.

Natural or native bran generally has soluble fiber and insoluble fiber. For example, the natural amount of water soluble fiber, or water extractable xylans may be about 0.8% by weight, based upon the weight of the whole grain flour. The xylanase and/or pentosanase enzyme generally attacks the water soluble xylans first or to a more effective extent than it attacks the insoluble fiber. In embodiments of the present invention, the enzymatic treatment is conducted to attack the natural soluble fiber and the insoluble fiber. The enzymatic treatment which attacks the insoluble fiber produces additional soluble fiber, and increases the water extractable or water soluble xylans, a substantial portion of which in turn are enzymatically converted to sugars comprising xylose and arabinose. Accordingly, the insoluble fiber of the bran and germ is converted into water soluble fiber and sugars comprising xylose, and arabinose to an extent which reduces the water holding capacity, rather than increasing the water holding capacity of the bran and germ, and the whole grain flour containing the enzymatically treated bran and germ.

For example, the natural amount of water soluble fiber, or water extractable xylans may be about 0.8% by weight, based upon the weight of the whole grain flour. The enzymatic treatment may, for example, increase the water extractable xylans from 0.8% by weight of the flour, to for example, 1.2% by weight to 1.7% by weight of flour after enzymatic treatment. The weight of the extractable xylans may thus increase by about 50% to about 112% or about double, after enzymatic treatment, yet is only up to about 2% of total flour weight or about 3% of bran and germ weight (assuming 32% extraction), after enzymatic treatment. In embodiments, the enzymatic treatment may increase the water extractable arabinoxylans content to about 1% by weight to about 10% by weight, preferably to about 1.5% by weight to about 5% by weight, based upon the weight of the bran and germ. If the amount of extractable arabinoxylans is increased too high, it may substantially alter the composition of the whole grain flour.

The total amount of free sugar solids in untreated whole grain flour may generally be about 0.46% by weight (of which about 49% by weight may be sucrose, about 14% by weight may be glucose, and only about 1.7% may be xylose), based upon the weight of the whole grain flour, or about 1.4% total free sugar solids by weight, based upon the weight of the bran and germ fraction (assuming 32% by weight extraction). The amount of xylose in the untreated bran and germ fraction would thus be about 0.0238% (1.7%×1.4%), based upon the weight of the bran and germ fraction (assuming 32% by weight extraction). The enzymatic treatment may, for example, increase the total amount of free sugar solids in untreated whole grain flour from 0.46% by weight of the whole grain flour, to for example, about 0.75% by weight of the whole grain flour after enzymatic treatment, of which about 31% by weight may be sucrose, about 60% by weight may be glucose, and about 4% by weight may be xylose, based upon the total free sugar solids of the enzyme treated whole grain flour. The 4% by weight xylose, based upon the weight of the total sugar solids in the enzyme treated whole grain flour is more than double the 1.7% by weight xylose, based upon the total amount of the sugar solids of the untreated whole grain flour. If the amount of sugars produced is too high, the products may be too dark, and may be unappealing if the amount of fiber or dietary fiber for the whole grain flour product is substantially reduced or different from that of natural whole grain flour. In embodiments, the enzymatic treatment may increase the xylose content to about 2% by weight to about 10% by weight, preferably to about 4% by weight to about 10% by weight, for example, from about 6% by weight to about 8% by weight, based upon the weight of the bran and germ.

In embodiments, the enzymatic treatment may be conducted to an extent which reduces the water holding capacity or solvent retention capacity (SRC water) of the bran and germ to less than about 80, preferably less than about 75, more preferably less than about 70. The enzymatic treatment may reduce the water holding capacity or solvent retention capacity (SRC water) of the whole wheat flour to less than about 75, preferably less than about 65, more preferably less than about 60. In embodiments, the water holding capacity or solvent retention capacity (SRC sucrose) of the bran and germ may be reduced to less than about 80, preferably less than about 75, more preferably less than about 70, and the water holding capacity or solvent retention capacity (SRC sucrose) of the whole wheat flour may be reduced to less than about 75, preferably less than about 70, more preferably less than about 65, by the enzymatic treatment.

In embodiments, the enzymatic treatment may be conducted at a pH of about 5 to about 9, preferably from about 6 to 8, for example from about 6.5 to 7.5. The moisture content of the bran and germ subjected to the enzymatic treatment, such as during tempering, milling, grinding, hydration, optional stabilization, dough production, lay time, and transport should be sufficient to hydrate the bran and germ and activate the enzymes and promote enzymatic activity. In embodiments, the moisture content of the bran and germ during enzymatic treatment may be from about 5% by weight to about 30% by weight, for example from about 7% by weight to about 27% by weight, preferably from about 12% by weight to about 20% by weight, based upon the weight of the bran and germ fraction. In embodiments, water may be added to the bran and germ fraction, and/or the endosperm fraction to provide a whole grain flour water content of preferably from about 13% by weight to about 14% by weight, based upon the weight of the final whole grain flour.

In embodiments where tempering is employed, the tempering of the whole wheat kernels or grains with the water and enzyme composition may be at a temperature of from about 10° C. to about 40° C., preferably from about 25° C. to about 35° C., or about room temperature.

In embodiments where hydration of the bran and germ fraction is employed, hydrating of the ground bran and germ fraction with water and the enzyme composition may be at a temperature of from about 10° C. to about 90° C., generally less than about 80° C., for example from ambient temperature to about 70° C., preferably from about 65° C. to about 75° C. In embodiments, the water and the enzyme composition may be combined to obtain a sprayable water solution which can be sprayed upon the ground bran and germ fraction, which may heated in a heat exchanger, or stabilizer, to a temperature of, for example, about 65° C. to about 75° C.

In embodiments the enzymatic treatment may be conducted without heating, or with heating which avoids substantial gelatinization of starch in the bran and germ. In embodiments of the invention, the enzymatic treatment temperatures and times, the optional stabilization temperature and stabilization time, and moisture contents may be controlled so that starch gelatinization resulting from the enzymatic treatment and optional stabilization in the bran and germ fraction may be less than about 25%, preferably less than about 10%, most preferably less than about 5%, as measured by differential scanning calorimetry (DSC). The low degree of starch gelatinization and low degree of starch damage achieved in the present invention are exemplified by a starch melting enthalpy of greater than about 4 J/g, preferably greater than about 5 J/g, based upon the weight of starch in the enzyme treated, optionally stabilized bran and germ fraction, as measured by differential scanning calorimetry (DSC), at a peak temperature of from about 65° C. to about 70° C. In embodiments the enzymatically treated, optionally stabilized bran and germ fraction may have a starch melting enthalpy of greater than about 2 J/g, based upon the weight of the bran and germ fraction, as measured by differential scanning calorimetry (DSC), at a peak temperature of from about 60° C. to about 65° C. In embodiments of the invention, the enzymatically treated, optionally stabilized whole grain flour, such as whole grain wheat flour, may have a low degree of starch gelatinization of less than about 25%, preferably less than about 10%, most preferably less than about 5%, as measured by differential scanning calorimetry (DSC). The starch melting enthalpy of the starch contained in the whole grain wheat flour may be greater than about 4 J/g, preferably greater than about 5 J/g, based upon the weight of starch in the whole grain flour, as measured by differential scanning calorimetry (DSC), at a peak temperature of from about 65° C. to about 70° C.

Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," Cereal Foods World, Vol. 33, No. 3, pgs. 306-311 (March 1988).

The low degree of starch gelatinization and low amount of starch damage due to abrasion during grinding may be measured by the sodium carbonate-water solvent retention capacity (SRC sodium carbonate). Solvent retention capacity (SRC) may be measured by mixing a sample of the ingredient or component, such as the stabilized ground coarse fraction or bran component, or a stabilized whole-grain wheat flour, having a weight (A), e.g., about 5 g, with a large excess of water or other solvent, such as an aqueous solution of sodium carbonate (e.g. 5% by weight sodium carbonate) and centrifuging the solvent-flour mixture. The supernatant liquid may then be decanted and the sample may be weighed to obtain the weight of the centrifuged wet sample (B), wherein the SRC value is calculated by the following equation: SRC value=((B−A)/A))×100. In embodiments of the invention, the enzyme treated, optionally stabilized bran and germ fraction and the whole grain flour containing it may have a sodium carbonate-water solvent retention capacity (SRC sodium carbonate) comparable to the control.

The bran and germ fraction comprising bran and germ which is enzymatically treated may have at least about 40% by weight, preferably at least about 50% by weight bran and germ, and a starch content of less than about 60% by weight, preferably less than about 50% by weight, for example less than about 40% by weight, more preferably less than about 25% by weight, for example from about 15% by weight to about 20% by weight, based upon the weight of the bran and germ fraction.

In embodiments of the invention, the flavor and texture of a ground bran and germ fraction is improved by subjecting the ground bran and germ component to enzymatic treatment and heat stabilization while conveying and mixing the ground bran and germ fraction in a conveying and mixing device, as disclosed, for example, in PCT International Patent Application No. PCT/US2014/021007, filed Mar. 6, 2014, and International Patent Application Publication No. WO/2014/149810A1, published Sep. 25, 2014, each to Bin Zhao et al for "Bran and Germ Flavor and Texture Improvement," both of which are each herein incorporated by reference in their entireties. The ground bran and germ fraction may be obtained by the milling of whole grains in the production of whole grain flours. The whole grains may be tempered or untempered. The milling and grinding of the whole grains, and the bran and germ fraction to obtain a desired particle size distribution generally reduces the moisture content of the bran and germ fraction, particularly as the particle size decreases which creates a greater surface area for evaporation of moisture. Heat treatment at low moisture contents facilitates browning, and caramelization. However, in embodiments of the invention where starch gelatinization may be desired, or where increased lipase inhibition for stabilization is desired, the moisture content of a bran and germ fraction may be increased, by tempering or by hydration.

The feed or input temperature of the ground bran and germ component or fraction upon entering the conveying and mixing device may be less than about 120° F., generally from room temperature up to about 120° F., for example from about 70° F. to about 100° F. In the conveying and mixing device, the heating, may be conducted to heat the bran and germ component or fraction to a temperature of from about 285° F. to about 410° F. when it leaves the device, or at the exit die. The heating may be sufficient to volatilize volatile wheaty flavor components as well as moisture in the ground bran and germ component and to develop a buttery, nutty, caramelized flavor in the bran and germ component or fraction. The heating may be achieved by indirect heating using jacketed barrels and/or hollow mixing and conveying screws which are heated with a heating medium, such as steam or other known heat transfer medium or fluids. In embodiments, direct steam injection may be employed, such as via a hollow screw with elements containing holes for passage of the steam directly into the bran and germ component as it is being mixing and conveyed. Generally, the amount of moisture added by direct steam injection is less than about 5% by weight, for example from about 1% by weight to about 3% by weight, based upon the weight of the ground bran and germ component or fraction.

The higher input moisture contents for the bran and germ component or fraction may be employed where higher degrees of gelatinization are desired, such as for the production of high moisture content baked goods such as cakes and breads. However, lower input moisture contents are used where substantial starch gelatinization is to be avoided for baking functionality in the production of low moisture content baked goods such as crackers and cookies, and snacks.

In embodiments where the heating of the bran and germ component is conducted to avoid substantial gelatinization of starch contained in the bran and germ component, such as for low moisture content baked good applications such as cookies, crackers, and snacks, the conveying and mixing may be at low pressure, with heating being at low moisture contents. In such embodiments, the ground bran and germ component subjected to heating may have a moisture content of from about 5% by weight to about 12% by weight, preferably from about 7% by weight to about 9% by weight, most preferably from about 7.5% by weight to about 8.5% by weight, based upon the weight of the ground bran and germ component. The heating of the ground bran and germ component or fraction may be from an input or feed temperature of less than about 120° F. to an exit temperature from the device of about 290° F. to about 350° F., for example from about 310° F. to about 330° F., to develop a buttery, nutty, caramelized flavor in the bran and germ fraction. The heating may be conducted for a period of time of from about 10 seconds to about 6 minutes, for example from about 30 seconds to about 2 minutes to develop desirable flavor notes. The low pressure conveying and mixing device may be operated at atmospheric pressure with optional steam injection.

In preferred embodiments, a stream of atomized water and enzyme may be sprayed into the conveying and mixing device for enzymatic treatment of the ground bran and germ fraction. The moisture content of the bran and germ during the enzymatic treatment may be from about 5% by weight to about 30% by weight, for example from about 7% by weight to about 27% by weight, preferably from about 12% by weight to about 20% by weight, based upon the weight of the bran and germ fraction, and the hydrating of the ground bran and germ fraction with the water and the enzyme composition may be at a temperature of from about 10° C. to about 90° C., generally less than about 80° C., for example from ambient temperature to about 70° C., preferably from about 65° C. to about 75° C.

Exemplary of low pressure, relatively low shear, conveying and mixing devices for use in the low pressure, low gelatinization embodiments of the present invention is a Turbulizer® continuous high shear paddle mixer, manufactured by Bepex International LLC, 333 N.E. Taft Street, Minneapolis, Minn. 55413, USA, such as a Turbulizer Model TCJS-8. The paddle elements allow adjustment of angle and housing clearance. This feature of paddle mixers, in combination with high paddle tip speeds, up to 13,000 ft./min., provides flexibility for control of residence time and the mix intensity or shear imparted on materials. Residence time can be controlled and can be very short, in the range of 2-30 seconds. The thin working layer of material in the paddle mixers promotes excellent indirect heat transfer efficiency in jacketed models and a self-cleaning effect that eliminates lost product on start up and shut down.

The ground bran and germ component or fraction treated in accordance with the xylanase and/or pentosanase enzyme treatment of the present invention may be obtained from the milling of whole grains using known flour milling and/or grinding operations for obtaining a bran and germ fraction or bran component and an endosperm fraction, and for obtaining flours and fractions and components having particle size distributions such as disclosed in U.S. Patent Application Publication No. US 2005/0136173 A1 to Korolchuk, U.S. Patent Application Publication No. US 2006/0073258 A1, to Korolchuk, U.S. Patent Application Publication No. 20070292583, U.S. Pat. Nos. 8,133,527, 8,173,193, and International Patent Application Publication No. WO/2007/149320 each to Haynes et al, U.S. Patent Application Publication No. 2007/0269579 to Dreese et al and U.S. Pat. No. 7,258,888 to Dreese et al, the disclosures of which are each herein incorporated by reference in their entireties. In preferred embodiments, the flour milling and/or grinding operations for obtaining a bran and germ fraction or bran component and an endosperm fraction, and for obtaining flours and fractions and components having particle size distributions as disclosed in U.S. Patent Application Publication No. 20070292583, U.S. Pat. Nos. 8,133,527, 8,173, 193, and International Patent Application Publication No. WO/2007/149320 each to Haynes et al, and U.S. Provisional Application No. 61/457,315, filed Feb. 24, 2011, and International Application No. PCT/US12/26490, filed Feb. 24, 2012, published as WO2012/148543 A1, each in the name of Derwin G. Hawley et al, all the disclosures of which are each herein incorporated by reference in their entireties, can be employed. In embodiments of the invention, stabilization by treatment with a lipase inhibitor as disclosed in International Patent Publication No. WO/2012/142399 in the name of Bin Zhao et al, the disclosure of which is herein incorporated by reference in its entirety, may be employed with the enzymatic treatment of the present application to help reduce wheaty flavors and enhance the caramelized flavor of the products produced by the methods disclosed therein, provided the lipase inhibitor stabilization treatment conditions, such as the pH or lipase inhibitor, do not adversely affect the treatment with the xylanase and/or pentosanase enzyme.

For example, in embodiments of the invention, the milling and grinding operations as disclosed in said U.S. Provisional Application No. 61/457,315, filed Feb. 24, 2011, and International Application No. PCT/US12/26490, filed Feb. 24, 2012, published as WO2012/148543 A1, each in the name of Derwin G. Hawley et al, may be employed to produce a stabilized whole grain flour having a particle size distribution of 0% by weight on a No. 35 (500 micron) U.S. Standard Sieve, and less than or equal to about 20% by weight, preferably less than or equal to about 10% by weight on a No. 70 (210 micron) U.S. Standard Sieve, or a stabilized whole grain flour having a particle size distribution of up to about 100% by weight through a No. 70 (210 micron) U.S. Standard Sieve, or a stabilized whole grain flour having a particle size distribution of at least 75% by weight, preferably at least 85% by weight less than or equal to 149 microns and less than or equal to 5% by weight greater than 250 microns. In embodiments of the invention, the ground bran and germ component or fraction may have a particle size distribution of less than or equal to 15% by weight, preferably less than or equal to 12% by weight, most preferably 0% by weight on a No. 35 (500 micron) U.S. Standard Sieve, and less than or equal to about 40% by weight, for example less than or equal to about 35% by weight, preferably less than or equal to about 20% by weight, most preferably less than or equal to about 10% by weight on a No. 70 (210 micron) U.S. Standard Sieve. Also, in embodiments the ground bran and germ component or fraction may have a particle size distribution of at least about 65% by weight, for example at least about 75% by weight, preferably at least about 85% by weight having a particle size of less than or equal to 149 microns, and less than or equal to about 15% by weight, for example less than or equal to about 10% by weight, preferably less than equal to about 5% by weight having a particle size of greater than 250 microns, and up to about 40% by weight, for example up to about 25% by weight having a particle size of greater than 149 microns but less than or equal to 250 microns. In embodiments, the ground bran and germ component or fraction may have, on a solids basis, a starch content of from about 10% by weight to about 60% by weight, for example from about 10% by weight to about 45% by weight, based upon the weight of the ground bran and germ component or fraction. The amount of the ground bran and germ component or fraction may be from about 20% by weight to about 40% by weight, generally from about 25% by weight to about 40% by weight, preferably from about 31% by weight to about 40% by weight, most preferably from about 32% by weight to about 35% by weight, based upon the total weight of the whole grain.

In other embodiments of the invention, the milling and grinding operations as disclosed in said U.S. Patent Application Publication No. 20070292583, U.S. Pat. Nos. 8,133,527, 8,173,193, and International Patent Application Publication No. WO/2007/149320 each to Haynes et al may be employed to produce a stabilized whole grain flour having a particle size distribution of less than about 10% by weight, preferably less than about 5% by weight on a No. 35 (500 micron) U.S. Standard Sieve, about 20% by weight to about 40% by weight on a No. 60 (250 micron) U.S. Standard Sieve, about 10% by weight to about 60% by weight, preferably from about 20% by weight to about 40% by weight on a No. 100 (149 micron) U.S. Standard Sieve, and less than about 70% by weight, for example from about 15% by weight to about 55% by weight, through a No. 100 (149 micron) U.S. Standard Sieve. The ground or milled bran and germ component or fraction employed may contain bran in an amount of at least about 50% by weight, based upon the weight of the ground coarse fraction. The amount of germ present in the ground coarse fraction or bran component may be about the same relative amount to the bran as it is in the intact grain. The amount of starch or endosperm present in the ground coarse fraction, may be less than about 40% by weight, but generally at least about 10% by weight starch or endosperm, for example from about 15% by weight to about 35% by weight starch, preferably less than or equal to about 30% by weight, based upon the weight of the ground coarse fraction. In preferred embodiments, the ground coarse fraction may contain at least about 60% by weight bran, and at least about 10% by weight germ, based upon the weight of the ground coarse fraction. The ground or milled bran and germ component or fraction may have a particle size distribution of at least about 40% by weight of the fraction or component having a particle size greater than or equal to 149 microns, and less than or equal to about 35% by weight having a particle size greater than or equal to 500 microns. In other embodiments, the ground or milled coarse fraction or bran component may have a particle size distribution of about 0.5% by weight to about 5% by weight greater than or equal to 841 microns, about 10% by weight to about 30% by weight less than 841 microns but greater than or equal to 500 microns, about 25% by weight to about 70% by weight greater than or equal to 149 microns but less than 500 microns, and less than or equal to about 60% by weight less than 149 microns, with the percentages adding up to a total of 100% by weight. More preferably, the ground or milled coarse fraction or bran component may have a particle size distribution of about 0.5% by weight to about 5% by weight greater than or equal to 841 microns, about 15% by weight to about 25% by weight less than 841 microns but greater than or equal to 500 microns, about 45% by weight to about 60% by weight greater than or equal to 149 microns but less than 500 microns, and from about 10% by weight to about 30% by weight less than 149 microns, with the percentages adding up to a total of 100% by weight.

Whole cereal grains with moisture contents of from about 8% to about 15% by weight may be employed, with moisture contents of about 10% by weight to about 14.5% by weight being preferred for milling or grinding purposes, and moisture contents of about 12.5% by weight to about 13.5% by weight being particularly preferred. If there is too little moisture in the grains, the grains may undesirably shatter and create damaged starch. Too high an amount of moisture may render the grains susceptible to excessive starch gelatinization and may also cause the grains to be difficult to mill or grind. For these reasons, grain moisture contents of from about 10% by weight to about 14.5% by weight are preferred just prior to milling. If the moisture content of the grains is too low, moisture may be added to the dry grains prior to milling to increase the moisture content to an acceptable level for milling. Moisture addition may be achieved by tempering the grains in an aqueous solution or spraying their surfaces with an aqueous solution and permitting them to soak for sufficient amount of time to allow absorption and distribution of the water throughout the bran and germ.

Whole grains contain primarily the endosperm, bran, and germ, in diminishing proportions, respectively. In whole wheat grains, for example, at field moisture of about 13% by weight, the endosperm or starch is about 83% by weight, the bran is about 14.5% by weight, and the germ is about 2.5% by weight, based upon the weight of the intact grain. The endosperm contains the starch, and is lower in protein content than the germ and the bran. It is also low in crude fat and ash constituents. The bran (pericarp or hull) is the mature ovary wall which is beneath the cuticle, and comprises all the outer cell layers down to the seed coat. It is high in non-starch-polysaccharides, such as cellulose and pentosans. The bran or pericarp tends to be very tough due to its high fiber content and imparts a dry, gritty mouthfeel, particularly when present in large particle sizes. It also contains most of the lipase and lipoxygenase of the grain which present a need for stabilization. As the extent of the grinding or milling increases, the bran particle size approaches the particle size of the starch, making the bran and starch harder to separate. Also, starch damage tends to increase due to more mechanical energy input, and abrasiveness of the bran compared to the endosperm, and rupturing of the starch granules. Also, mechanically damaged starch tends to be more susceptible to gelatinization. The germ is characterized by its high fatty oil content. It is also rich in crude proteins, sugars, and ash constituents.

In embodiments of the invention, the moisture content of the bran fraction may be controlled by tempering the whole grains such that exterior portions of the berries or grains are moistened without substantially moistening interior portions thereof. Such treatment avoids or substantially reduces the need to dry the fine fraction obtained from the interior or endosperm of the berry or grain, while moistening the exterior or bran and germ portions of the berry for stabilization treatment. Tempering methods which can be used to accomplish a surface or bran moistening include soaking the whole grains for limited time periods in a bath or vat, for example. In other embodiments, the whole grains may be surface sprayed with water and permitted to temper. Tempering times of from about 10 minutes to about 24 hours may be employed according to some embodiments of the invention. Soaking the grains for a longer time period is not desirable because it may result in deep penetration of water into the grain, moistening the interior portion of the grain, and resulting in excessive starch gelatinization.

In other embodiments, one or more bran and germ fractions, or a bran component, rather than or in addition to the whole grain may be moistened so as to achieve a desired moisture content in the bran and germ fraction or bran component. In embodiments of the invention, the bran and germ fraction or bran component may be hydrated to such an extent with an aqueous solution so that the hydrated bran and germ component or fraction has a desired moisture content prior to enzymatic treatment with or without heat treatment for flavor development and stabilization.

In embodiments of the invention, the heat-treated bran and germ component or fraction may be permitted to cool in ambient air. In other embodiments, cooling after heat treatment may optionally be controlled using conventional cooling equipment to further minimize undesired gelatinization of starch. Generally, no further significant gelatinization occurs in the heat treated bran and germ component or fraction at temperatures lower than about 60° C. Then the heat-treated bran and germ component or fraction may be cooled to room temperature, or about 25° C.

In other embodiments of the invention, an enzyme treated, optionally heat treated, stabilized bran and germ component or fraction may be combined with the endosperm fraction to obtain an enzyme treated, optionally stabilized whole grain flour, such as whole grain wheat flour, which includes bran, germ and endosperm. The bran and germ component or fraction is preferably derived from the same whole grains from which the endosperm fraction is derived. However, in other embodiments, the treated bran and germ component or fraction may be combined or blended with an endosperm fraction which is derived or obtained from a different source of grains. In each embodiment however, the enzyme treated, optionally stabilized bran and germ component or fraction and the endosperm fraction are combined or blended so as to provide an enzyme treated, optionally stabilized whole grain flour which contains endosperm, bran and germ in the same or substantially the same relative proportions as they exist in the intact grain.

The enzyme treated, optionally stabilized ground bran and germ component or fraction may be blended, combined, or admixed with the endosperm fraction using conventional metering and blending apparatus known in the art to obtain an at least substantially homogeneous enzyme treated, optionally stabilized whole grain flour with substantially reduced or no wheaty flavor, but with nutty, buttery sweet, browned, caramelized flavor and a non-gritty texture. Exemplary of mixing or blending devices which may be employed include batch mixers, rotating drums, continuous mixers, and extruders.

The moisture content of the enzyme treated, optionally stabilized whole grain flour, may range from about 10% by weight to about 14.5% by weight, based upon the weight of the whole grain flour, and the water activity may be less than about 0.7. In embodiments, the whole grain wheat flour may have a protein content of from about 10% by weight to about 14% by weight, for example about 12% by weight, a fat content of from about 1% by weight to about 3% by weight, for example about 2% by weight, and an ash content of from about 1.2% by weight to about 1.7% by weight, for example about 1.5% by weight, each of the percentages being based upon the weight of the whole grain flour.

The enzyme treated, optionally stabilized whole grain wheat flour containing the enzyme treated ground bran and germ component or fraction exhibits excellent baking functionality where an oven spread or cookie spread may be at least about 130% of the original prebaked dough diameter, as measured according to the AACC 10-53 bench-top method.

A preferred whole wheat flour having reduced grittiness and a reduced whole wheat flavor may contain a heat stable xylanase-treated and/or pentosanase-treated bran and germ fraction which comprises water soluble fiber, xylose, and arabinose, and an endosperm fraction. The preferred whole wheat flour may also have a water holding capacity or solvent retention capacity (SRC water) of less than about 60, and a degree of starch gelatinization of less than 25% as measured by differential scanning calorimetry (DSC).

Embodiments of the invention provide an improved raw material stability and flavor, and greater than one month shelf life, for example 2 months or more, under accelerated storage conditions, for a stabilized bran and germ component or fraction or ingredient and for a stabilized whole grain flour, such as stabilized whole grain wheat flour. A more stable food product can be stored under similar conditions for a longer period of time than a less stable food product before going rancid. The presence of rancidity can be monitored and measured in a multiplicity of different manners, including sensory testing (e.g., taste and/or odor analysis), lipoxygenase or lipase activity level measurements, free fatty acid level measurements, and/or hexanal level measurements.

In other embodiments of the invention, the enzyme treated, optionally stabilized ground bran and germ component or fraction or whole grain flour, may be combined, admixed, or blended with refined wheat flour to obtain a fortified flour, product or ingredient, such as fortified wheat flour. The fortified wheat flour product may contain the enzyme treated, optionally stabilized bran and germ component or fraction or whole grain flour, such as whole grain wheat flour, in an amount of from about 14% by weight to about 40% by weight, for example from about 20% by weight to about 30% by weight, based upon the total weight of the fortified flour product, such as fortified wheat flour product.

The enzyme treated, optionally stabilized whole grain flour, such as whole grain wheat flour, may be employed to partially or completely replace refined wheat flour, or other flours, in a variety of food products. For example, in embodiments of the invention, at least about 10% by weight, at most 100% by weight, for example from about 30% by weight to about 50% by weight of the refined wheat flour, may be replaced by the enzyme treated, optionally stabilized whole grain wheat flour to increase nutritional values of refined wheat flour products with little, if any detriment to product appearance, texture, aroma, or taste.

The enzyme treated, optionally stabilized bran and germ components or fractions and whole grain wheat products, obtained in an embodiment of the invention can be packaged, stably stored, and subsequently or immediately further used in food production. The enzyme treated, optionally stabilized bran products and flour products are ready for further processing into the finished food products by adding water and other applicable food ingredients, mixing, shaping, and baking or frying, etc. Doughs containing the enzyme treated, optionally stabilized bran and germ components or fractions and whole grain flours, such as whole grain wheat flour, may be continuously produced and machined, for example sheeted, laminated, molded, extruded, or coextruded, and cut, on a mass production basis. The finished whole grain products (e.g., biscuits, cookies, crackers, snack bars, etc.) have a pleasant, non-grainy texture with the characteristics of a nutty, sweet, browned, caramelized taste.

The enzyme treated, optionally stabilized, ground bran and germ components or fractions and whole-grain flour products, such as whole-grain wheat flour products, of the present invention may be used in a wide variety of food products. The food products include farinaceous food products, and biscuit type products in particular, pasta products, ready-to-eat cereals, and confections. In one embodiment, the food products may be bakery products or snack foods. The bakery products may include cookies, crackers, pizza crusts, pie crusts, breads, bagels, pretzels, brownies, muffins, waffles, pastries, cakes, quickbreads, sweet rolls, donuts, fruit and grain bars, tortillas, and par-baked bakery products. The snack products may include snack chips and extruded, puffed snacks. The food product particularly may be selected from cookies, crackers, and cereal crunch bars. The cookies may be bar-type products, extruded, coextruded, sheeted and cut, rotary molded, wire cut, or sandwich cookies. Exemplary of cookies which may be produced include sugar wafers, fruit filled cookies, chocolate chip cookies, sugar cookies, and the like. The crackers may be fermented or non-fermented type crackers, and graham crackers. The baked goods produced may be crackers or cookies having a full fat content or they may be a reduced fat, low-fat, or no-fat product.

In addition to water, cookie, cracker, and snack ingredients which may be admixed with the enzyme treated, optionally stabilized whole grain flour, include enriched wheat flour, vegetable shortening, sugar, salt, high fructose corn syrup, leavening agents, flavoring agents and coloring agents. Enriched wheat flours which may be used include wheat flours enriched with niacin, reduced iron, thiamine mononitrate and riboflavin. Vegetable shortenings which may be used include those made of partially hydrogenated soybean oil. Leavening agents which may be used include calcium phosphate and baking soda. Coloring agents which may be used include vegetable coloring agents such as annatto extract and turmeric oleoresin.

In some embodiments, the dough made includes dough comprising various combinations of the aforementioned cookie, cracker, and snack ingredients in conventional amounts. According to some embodiments, all of the foregoing ingredients are homogeneously admixed and the amount of water is controlled to form a dough of desired consistency. The dough may then be formed into pieces and baked or fried to produce products having excellent moisture, geometry, appearance, texture, and flavor attributes.

In embodiments of the invention, the total amount of the flour component, such as the enzyme treated, optionally stabilized whole grain flour and optional other flours which may be used in the baked good compositions, such as cookies, biscuits and crackers, of the present invention may range, for example, from about 20% by weight to about 80% by weight, preferably from about 45% by weight to about 75% by weight, based upon the weight of the dough, not including the weight of inclusions. Unless otherwise indicated, all weight percentages are based upon the total weight of all ingredients forming the doughs or formulations, except for inclusions such as confectionary or flavor chips or chunks, nuts, raisins, and the like. Thus, "the weight of the dough" does not include the weight of inclusions, but "the total weight of the dough" does include the weight of inclusions.

Process-compatible ingredients, which can be used to modify the texture of the products produced, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to promote chewiness in the baked product.

In addition to the humectant sugars, other humectants, or aqueous solutions of humectants which are not sugars or possess a low degree of sweetness relative to sucrose, may also be employed in the dough or batter. For example, glycerol, sugar alcohols such as mannitol, maltitol, xylitol and sorbitol, and other polyols, may be used as humectants. Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In embodiments, the total sugar solids content, or the texturizing ingredient content, such as of the doughs produced, may range from zero up to about 50% by weight, based upon the weight of the dough, not including the weight of inclusions.

The sugar solids may be replaced in whole or in part by a conventional sugar substitute or conventional bulking agent such as polydextrose, hollocellulose, microcrystalline cellulose, mixtures thereof, and the like. Polydextrose is a preferred sugar substitute or bulking agent for making reduced calorie baked goods. Exemplary replacement amounts may be at least about 25% by weight, for example at least about 40% by weight, preferably from about 50% by weight to about 75% by weight, of the original sugar solids content.

In embodiments, the amount of the conventional sugar substitute, conventional bulking agent, or conventional flour substitute, such as polydextrose, may be from about 10% by weight to about 35% by weight, for example from about 15% by weight to about 25% by weight, based upon the weight of the dough, not including the weight of the inclusions.

The moisture contents of the doughs should be sufficient to provide the desired consistency to enable proper forming, machining, and cutting of the dough. The total moisture content of the doughs will include any water included as a separately added ingredient, as well as the moisture provided by flour (which usually contains about 12% to about 14% by weight moisture), the moisture content of any bulking agent or flour substitute such as a resistant starch type III ingredient, and the moisture content of other dough additives included in the formulation, such as high fructose corn syrup, invert syrups, or other liquid humectants.

Taking into account all sources of moisture in the dough or batter, including separately added water, the total moisture content of the doughs or batters which may be used is generally less than about 50% by weight, preferably less than about 35% by weight, based upon the weight of the dough or batter, not including the weight of the inclusions. For example, cookie doughs employed may have a moisture content of less than about 30% by weight, generally from about 10% by weight to about 20% by weight, based upon the weight of the dough, not including the weight of inclusions.

Oleaginous compositions which may be used to obtain the doughs and baked goods of the present invention may include any known shortening or fat blends or compositions, useful for baking applications, such as butter, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions comprise soybean oil. In embodiments, the dough may include up to about 30% by weight, for example from about 5% by weight to about 25% by weight of at least one oil or fat, based upon the weight of the dough.

Baked goods which may be produced in accordance with embodiments of the invention include reduced calorie baked goods which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

In addition to the foregoing, the doughs may include other additives conventionally employed in crackers and cookies. Such additives may include, for example, milk by-products, egg or egg by-products, cocoa, vanilla or other flavorings, in conventional amounts.

A source of protein, which is suitable for inclusion in baked goods, may be included in the doughs employed to promote Maillard browning. The source of protein may include non-fat dry milk solids, dried or powdered eggs, mixtures thereof, and the like. The amount of the proteinaceous source may, for example, range up to about 5% by weight, based upon the weight of the dough, not including the weight of inclusions.

The dough compositions may contain up to about 5% by weight of a leavening system, based upon the weight of the dough, not including inclusions. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

The doughs employed may include antimycotics or preservatives, such as calcium propionate, potassium sorbate, sorbic acid, and the like. Exemplary amounts, to assure microbial shelf-stability, may range up to about 1% by weight of the dough, not including the weight of inclusions.

Emulsifiers may be included in effective, emulsifying amounts in the doughs. Exemplary emulsifiers which may be used include mono- and di-glycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough, not including the weight of inclusions.

Production of the doughs may be performed using conventional dough mixing techniques and equipment used in the production of cookie and cracker doughs.

While baking times and temperatures will vary for different dough or batter formulations, oven types, etc., in general, commercial cookie, brownie and cake-baking times may range from about 2.5 minutes to about 15 minutes, and baking temperatures may range from about 250° F. (121° C.) to about 600° F. (315° C.).

The baked products may have a relative vapor pressure ("water activity") of less than about 0.7, preferably less than about 0.6, for preservative free microbial shelf-stability. Cookie, brownie and cake products generally have a moisture content of less than about 20% by weight, for example, from about 2% by weight to about 9% by weight for cookies, based upon the weight of the baked product, exclusive of inclusions.

For example, in embodiments of the invention, a dough for producing a shelf-stable cracker or cookie, such as a graham cracker may include from about 40% by weight to about 65% by weight of enzyme treated, optionally stabilized whole grain wheat flour, from about 15% by weight to about 25% by weight of at least one sugar such as sucrose, from about 5% by weight to about 25% by weight of at least one oil or fat such as vegetable oil or shortening, from about 0% by weight to about 10% by weight of at least one humectant sugar such as high fructose corn syrup and honey, from about 0% by weight to about 1% by weight of a protein source such as non-fat dry milk solids, from about 0% by weight to about 1% by weight of a flavoring, such as salt, from about 0.5% by weight to about 1.5% by weight of leavening agents, such as ammonium bicarbonate and sodium bicarbonate, and from about 8% by weight to about 20% by weight of added water, where each weight percentage is based upon the weight of the dough, and the weight percentages add up to 100% by weight.

In embodiments, wheaty flavor and grainy texture may be reduced, and sweet, buttery, nutty, brown, caramelized flavor may be increased compared to a control produced without enzymatic treatment with xylanase and/or pentosanase by at least 3%, for example by at least 5%, preferably at least 7%, most preferably at least 10%, based upon sensory evaluation by an expert taste panel using a score or scale of 1 to 100 where a rating of 1 has the lowest intensity, and a rating of 100 has the highest intensity of wheaty flavor or grainy texture, or sweet, nutty, buttery, browned, or caramelized flavor. The percentage reduction or percentage increase, or score may depend upon the treatment conditions such as bran and germ component initial moisture content, heat treatment temperature, and extent of moisture removal and venting.

Moreover, baked goods, such as cookies, produced using the enzyme treated, optionally stabilized bran and germ component or fraction, and enzyme treated, optionally stabilized whole grain flour containing it, may exhibit extended superiorly reduced wheaty flavor and grainy texture, and superiorly improved sweet, nutty, buttery, browned, or caramelized flavor development and retention and other sensory attributes compared to those of baked goods or control samples containing the same composition but made with whole grain flour produced without the enzymatic treatment with xylanase and/or pentosanase.

For example, in embodiments, baked good sensory attributes, such as positive sensory attributes of sweet, nutty, buttery, browned, or caramelized flavor for a cookie or graham cracker may be increased, and negative sensory attributes of wheaty flavor and grainy texture may be decreased, compared to a control produced without enzymatic treatment with xylanase and/or pentosanase by at least 3%, for example at least 5%, preferably at least 7%, most preferably at least 10%, based upon sensory evaluation by an expert taste panel using a scale of 1 to 100 where a rating of 1 has the lowest intensity, and a rating of 100 has the highest intensity of the attribute such as sweet flavor nutty, buttery, browned, or caramelized flavor etc. The percentage increase or percentage reduction, or score may depend upon the treatment conditions such as bran and germ component moisture content, heat treatment temperature, amount of moisture reduction and amount of venting of volatile components.

Exemplary sensory attributes which may be evaluated to show similar improvements include categories such as aroma, appearance, hand touch, texture/mouthfeel, flavor, and aftertaste/afteraffect. Exemplary of specific sensory attributes within these categories which may be evaluated are:

a) Aroma: sweet, nutty, oil, wheat, baked, and corn, attributes;

b) Appearance: Brown color, edge color, and opposite contrast attributes;

c) Hand Touch: Crumbs, surface roughness, and oily attributes;

d) Texture/Mouthfeel: Initial bite hardness, crumbly, dry, crunchy, dissolve rate, noticeable particulates, sticks to teeth, and mouth coating, attributes;

e) Flavor: Overall, salt, sweet, wheat, nutty, oil, corn, baked, and butter attributes; and f) Aftertaste/Aftereffect: Oil, wheat, sticks to teeth, mouth drying, sweet, bitter, corn, mouth coating, salivating, and linger attributes.

The present invention is illustrated by the following non-limiting examples wherein all parts, percentages, and ratios are by weight, all temperatures are in ° C., and all temperatures are atmospheric, unless indicated to the contrary:

Example 1

Part A: Tempering of Whole Kernel Wheat with Enzyme

The objective of this Example is to describe how soft red wheat kernels are tempered with water containing enzyme in order to produce a non-bleached whole grain flour with enzyme treated bran. Initial wheat moisture of 12.99%, is increased to a final kernel moisture of 14.0%, by adding water and enzyme to the wheat at ambient temperature, and holding the wheat for 8 hours. The amount of water and enzyme added is calculated according Table 1:

TABLE 1

Wheat Tempering With Different Amounts And Types Of Enzyme

| Enzyme | Kernel WT (g) | Kernel moisture (%) | Tempering water (g) | Enzyme (g) | Enzyme Activity (units/g) | Enzyme Concentration in Wheat units/gm wheat |
| --- | --- | --- | --- | --- | --- | --- |
| Control | 2400 | 12.99 | 24.0 | 0 | | |
| Pen III | 2400 | 12.99 | 21.3 | 3 | 10,250 | 12.8 |
| Iogen 339 | 2400 | 12.99 | 21.3 | 3 | 24,000 | 30.0 |
| Iogen 340 | 2400 | 12.99 | 21.3 | 3 | 24,000 | 30.0 |
| Iogen 341 | 2400 | 12.99 | 21.3 | 3 | 8,300 | 10.38 |

Table 1 shows the three different types of enzymes, Pen III, Iogen 339, Iogen 340, and Iogen 341 tested in this Example. The table shows: (1) weight of wheat, (2) initial wheat moisture, (3) amount of temper water, (4) amount of each enzyme solution added, (5) enzyme activity, and 6) enzyme concentration in the wheat.

Procedure

Cleaned wheat sample (2400 g) is weighed in an air tight plastic jar and mixed with a corresponding amount of tempering water containing a specific amount of enzyme as shown in Table 1. The wheat is tempered for 8 hours at ambient temperature. For example, in order to obtain 12.81 units/gm wheat, 3 g of enzyme solution is added into 21.3 g of tap water. The dry or solids portion of the enzyme solution is only about 10% by weight. Once tempering water with enzyme is added into the wheat, the jar was sealed, shaken by hand for 1 min every 10 min for 6 times, then allowed to stand overnight.

Part B: Wheat Milling

The objective of this procedure was to produce whole grain flour from wheat kernels tempered as described in part A.

Procedure

The tempered wheat samples were milled with a Chopin Laboratory Mill CD1 (Chopin, France) which consisted of two units. The first was a regular mill consisting of two break rolls and the second was a smooth mill roll for reduction. Three main fractions are obtained from the mill: coarse semolina in the right-hand collecting-pan; break flour in the left-hand collecting-pan, and coarse bran. The semolina is processed through the reduction roll from which is obtained reduction overtails; in the collecting-pan, and reduction flour.

Table 2 shows the flour extraction yield. Yield was calculated on the basis of wheat milled. The flour yield was calculated as Yield=100×[(Coarse and fine brans wt.+overtails wt.)/wheat wt.], in this study.

TABLE 2

Flour Extraction Yield

| Enzyme | Wheat kernel WT (g) | Flour WT (g) | Extraction Yield (%) |
|---|---|---|---|
| Control | 2423.97 | 1647.6 | 68.0 |
| Pen III | 2424.19 | 1644.2 | 67.8 |
| Iogen 339 | 2424.27 | 1661.1 | 68.5 |
| Iogen 340 | 2425.09 | 1663.3 | 68.6 |
| Iogen 341 | 2424.38 | 1651.2 | 68.1 |

Part C: Heat Treatment of Bran Portion

The objective of this procedure was to heat treat the bran which was separated from Part B. For each sample, the conditions of temperature, pH and the heat treatment time, the substrate, and the amount of enzyme employed are shown in Table 3:

TABLE 3

Heat Treatment of Bran and Germ Fraction

| Sample | Test Conditions | Substrate | Amount (g enzyme/100 g substrate) |
|---|---|---|---|
| Iogen DP-339 | 25° C., pH 6.5 10 min | Wheat Bran | 0.125 g per 100 g |
|  | 70° C., pH 6.5 10 min | Wheat Bran | 0.125 g per 100 g |
|  | 85° C., pH 6.5 10 min | Wheat Bran | 0.125 g per 100 g |
|  | 93° C., pH 6.5 10 min | Wheat Bran | 0.125 g per 100 g |
| Iogen DP-340 | 25° C., pH 6.5 10 min | Wheat Bran | 0.125 g per 100 g |
|  | 70° C., pH 6.5 10 min | Wheat Bran | 0.125 g per 100 g |
|  | 85° C., pH 6.5 10 min | Wheat Bran | 0.125 g per 100 g |
|  | 93° C., pH 6.5 10 min | Wheat Bran | 0.125 g per 100 g |
| Iogen DP-341 | 25° C., pH 6.5 10 min | Wheat Bran | 0.125 g per 100 g |
|  | 70° C., pH 6.5 10 min | Wheat Bran | 0.125 g per 100 g |
|  | 85° C., pH 6.5 10 min | Wheat Bran | 0.125 g per 100 g |
|  | 93° C., pH 6.5 10 mm | Wheat Bran | 0.125 g per 100 g |
| Pentosanase | 25° C., pH 6.5 10 min | Wheat Bran | 0.125 g per 100 g |
|  | 70° C., pH 6.5 10 min | Wheat Bran | 0.125 g per 100 g |
|  | 85° C., pH 6.5 10 min | Wheat Bran | 0.125 g per 100 g |
|  | 93° C., pH 6.5 10 min | Wheat Bran | 0.125 g per 100 g |
| Control | 25° C., pH 6.5 10 min | Wheat Bran | 0 |
|  | 70° C., pH 6.5 10 min | Wheat Bran | 0 |
|  | 85° C., pH 6.5 10 min | Wheat Bran | 0 |
|  | 93° C., pH 6.5 10 min | Wheat Bran | 0 |

Procedure

Coarse bran and overtail were ground in a Perten mill. The break and reduction flour was saved for future recombination to natural whole wheat proportion bran, germ and endosperm. The separated ground bran was spread on 10×20 inch alumni tray. The tray with bran was heated at pH 6.5 for 10 min at different temperature 25° C., 70° C., 85° C., and 93° C. in VWR 1430 vacuum oven without vacuum. After the bran heat treatment, it was recombined with break and reduction flour to form the whole grain flour. The moisture of whole grain flour was measured and the results are shown in Table 4:

TABLE 4

Flour Moisture Content

| Flour Moisture % | Temperature at 10 min | | | |
|---|---|---|---|---|
|  | Ambient | 93° C. | 85° C. | 70° C. |
| Iogen 339 | 13.888 | 13.469 | 13.443 | 13.883 |
| Iogen 340 | 13.258 | 13.044 | 11.83 | 13.059 |
| Iogen 341 | 13.582 | 13.177 | 11.442 | 13.201 |
| Pen 3 | 13.966 | 13.112 | 13.896 | 13.653 |
| Control | 13.486 | 13.256 | 12.925 | 13.65 |

Summary

Wheat kernels were tempered with water containing different types of enzyme. Added moisture was adjusted according to the initial wheat kernel moisture so that the final kernel moisture after tempering was 14% which is considered to be a typical range for milling wheat. The amount of enzyme added to the temper water was 1,240 ppm (enzyme solution weight per initial weight of wheat) was tested. Normal milling behavior was observed for all types and amounts of enzyme treatments. Flour extraction yield was typically around 67% to 68%. All mill fractions were recombined to form whole grain flour with natural proportions of bran, germ and endosperm after bran heat treatment. There was a slight whole grain flour moisture loss for the bran and germ fraction which was heated above 85° C.

Example 2

The Functionality of Whole Grain Flour Made with Enzyme and Heat Treatment

In this example, the functionality of enzyme treated whole grain flour according to the present invention was compared to the functionality of untreated whole grain flour. Whole grain flours made with a natural proportion of bran and germ and endosperm produced without enzymatic treatment (control) and using enzymatic treatment at ambient temperature, and temperatures of 70° C., 85° C., and 93° C. with Iogen 339, Iogen 340, Iogen 341 and PEN III as in Example 1 are listed in Table 5 with their Solvent Retention Capacity (SRC) in water, sucrose, sodium carbonate, and lactic acid. The SRC serves as a practical test to monitor the function of specific flour components, such as the amount of damaged starch and baking functionality. The SRC assay method used was adapted and modified from AACC Method 56-10, according to the following procedure:

Materials:
  50 ml centrifuge tubes+caps
  5% weight sodium carbonate solvent
  Centrifuge (IEC, Centra GP8, 269 rotor, 2130 rpm)

Procedure:
  1. Weigh 50 ml centrifuge tubes+caps (for special tubes weight O-ring seals)
  2. Weigh and add 5.00 g of bran-germ mixture to each tube (determine moisture content of mixture)
  3. Add 25 g of solvent (pre-weighed solvent aliquots) to each tube
  4. Allow it to hydrate for 20 min, shaking every 5 min (5, 10, 15, 20)

5. Centrifuge for 15 min at 1000×g
6. Decant supernatant and drain 5 min at 450 angle and 5 min at 900 angle.
7. Put cap back and weigh pellet
8. Calculate:

$$SRC\% = \left(\left(\left(\frac{\text{tube, stopper, gel wt.} - \text{tube, stopper}}{\text{Flour wt.}}\right) - 1\right)\left(\frac{86}{100 - \text{flour moist}}\right) \times 100\right)$$

TABLE 5

SRC Results for Whole Grain Flours

|  | water | sucrose | Na$_2$CO$_3$ | Lactic |
|---|---|---|---|---|
| Control Ambient | 63.77 | 70.99 | 80.08 | 66.40 |
| Pen 3 Ambient | 59.28 | 68.37 | 79.26 | 63.32 |
| 339 Ambient | 61.07 | 71.55 | 80.56 | 67.23 |
| 340 Ambient | 59.94 | 71.48 | 83.05 | 65.39 |
| 341 Ambient | 62.06 | 72.77 | 82.62 | 64.72 |
| Control 70° C. | 63.06 | 73.11 | 79.62 | 67.27 |
| Pen 3 70° C. | 58.94 | 69.61 | 79.15 | 65.86 |
| 339 70° C. | 61.41 | 71.38 | 81.03 | 67.09 |
| 340 70° C. | 61.88 | 72.46 | 85.24 | 68.27 |
| 341 70° C. | 63.59 | 72.56 | 84.09 | 66.98 |
| Control 85° C. | 64.24 | 69.80 | 81.61 | 66.33 |
| Pen 3 85° C. | 48.40 | 55.31 | 63.35 | 87.19 |
| 339 85° C. | 59.28 | 68.89 | 81.68 | 65.99 |
| 340 85° C. | 59.31 | 69.10 | 81.35 | 65.93 |
| 341 85° C. | 60.59 | 63.67 | 80.08 | 66.56 |
| Control 93° C. | 62.03 | 68.40 | 76.72 | 64.80 |
| Pen 3 93° C. | 58.77 | 65.65 | 75.69 | 59.87 |
| 339 93° C. | 60.15 | 67.55 | 75.50 | 64.23 |
| 340 93° C. | 60.23 | 70.53 | 77.88 | 67.04 |
| 341 93° C. | 63.43 | 71.66 | 79.28 | 64.64 |

Summary

The enzyme and heat treatment of the whole grain flour can reduce the SRC water absorption especially at 85° C. The % retention of the sucrose solvent, which selectively swells the pentosan polymers, is significantly reduced from Control ambient-no enzyme treatment, from 71% SRC down to 55% and 64% SRC, for the PEN III and Iogen 341 85° C., enzyme treatment, respectively. Other solvents which selectively swell damaged starch and gluten show less change in solvent retention behavior as a result of pentosanase treatment.

Example 3

Sensory Evaluation of 100% Whole Grain Cookie:

The objective of this Example is to evaluate cookies made with whole grain flour containing a natural proportion of bran and germ, and endosperm, with and without enzyme treatment, to determine the effect of the enzymatic treatment on flavor and texture when baked in a cookie.

Samples
1. Climax
2. Whole Grain Flour (Low Temperature (LT))
3. Whole Grain Flour treated with Pen III Enzyme (Low Temperature (LT))
4. Whole Grain Flour treated with Enzyme 339 (Low Temperature (LT))
5. Whole Grain Flour (High Temperature (HT))
6. Whole Grain Flour treated with Pen III Enzyme (High Temperature (HT))

Methodology

The trained descriptive panel evaluated the products in a quantitative roundtable format for flavor and texture attributes. Each product was evaluated individually, and then discussed as a group. The panel leader guided the discussion to come to a consensus of what the similarities/differences were between the samples. The results of the sensory evaluation are shown in Table 6:

TABLE 6

Results of Sensory Evaluation of Whole Grain Flours

| Effect of Temperature | |
|---|---|
| Whole Grain Flour | Whole Grain Flour with Pen III Enzymes |
| Flour treated at HT had/was: | Flour treated at HT had/was: |
| Less hard (sl.) | Less hard (sl.) |
| Less crisp (sl.) | Less dense (sl.) |
| More dense | Faster rate of breakdown (sl.) |
| Less persistence of crisp | Less moist (sl.) |
| Slower rate of breakdown (sl.) | More cohesive of mass (sl.) |
| Less moist (sl.) | Smaller crumb size (sl.) |
| More cohesive of mass (sl.) | Less toothpacking (sl.) |
| More toothpacking (sl.) | Less scorched (sl.) |
| More scorched (sl.) | Less whole wheat (sl.) |
| More whole wheat (sl.) | Less wheat germ (sl.) |
| Less heated oil (sl.) | Less cardboard (sl.) |
| Less cardboard (sl.) | More sweet (sl.) |
| More bitter (sl.) | More baking soda (sl.) |
| than flour treated at LT. | than flour treated at LT. |

| Effect of Enzyme | | |
|---|---|---|
| Whole Grain Flour at LT | Whole Grain Flour at LT | Whole Grain Flour at HT |
| Flour with Pen III had/was: | Flour with 339 had/was: | Flour with Pen III had/was: |
| More crisp (sl.) | Less hard | Less hard (sl.) |
| More fracturable (sl.) | More crisp (sl.) | More crisp |
| More dense (sl.) | More fracturable (sl.) | More fracturable |
| Slower breakdown | Faster breakdown (sl.) | Less dense |
| Less moist | Smaller crumb size (sl.) | |
| Less cohesive mass (sl.) | More oily mouthcoat (sl.) | |

TABLE 6-continued

Results of Sensory Evaluation of Whole Grain Flours

| | | |
|---|---|---|
| Larger crumb size | Less baked | More persist. crisp (sl.) |
| More toothpacking | Less scorched | Faster breakdown (sl.) |
| Less raw/pasty | Less wheat germ (sl.) | Less moist (sl.) |
| More baked (sl.) | Less whole wheat | More toothpack (sl.) |
| More scorched (sl.) | More caramelized | Less raw/pasty |
| More wheat germ | Less heated oil (sl.) | More baked |
| More caramelized (sl.) | More sweet | Less whole wheat |
| More cardboard | than flour without. | More heated oil (sl.) |
| than flour without. | | More sweet (sl.) |
| | | Less bitter (sl.) |
| | | than flour without. |

Summary

Flour treatment temperature had small effects on the finished product. At Low Temperature, the Pen III enzyme had more impact on the texture of the product than the flavor (crispness, fracturability, moistness, toothpacking). The 339 enzyme had more impact on the flavor of the product than the texture (the flavor was notably more like the product made with Climax flour).

Example 4

Quantification of Water Extractable Pentosan and Simple Sugars from Whole Grain Flour, with and without, Enzyme Treatment The objective of this Example is to determine the effect of enzyme treatment on water extractable pentosan and simple sugars content from whole grain flour made from enzyme treatment during wheat kernel tempering. The following flours were analyzed:

(1) Control RT—whole grain flour (no enzyme, no heat treatment)
(2) Control, 70° C.—whole grain flour (no enzyme, heat treatment 70° C.)
(3) Pen3 70 C—whole grain flour (Pen3, heat treatment 70° C.)
(4) Iogen 340 70° C.—whole grain flour (Iogen 340, heat treatment 70° C.)
(5) G3 SWS RT—whole grain reference flour (no enzyme, no heat treatment)

Method:

Adapted from Carbohydrate Research 340(2005) 1319-1327 with the following modifications:

(1) Weight 5 g of each whole grain flour
(2) Add 25 g of distilled water
(3) Extract at room temp with intermittent shaking for 15 min
(4) Centrifuge 3,000×g, 15 min and decant supernatant
(5) Heat supernatant to 100 C for 10 min
(6) Centrifuge 3,000×g, 15 min and decant supernatant
(7) Decant supernatant and remove 2.5 ml aliquot for total hydrolysis and sugars analysis
(8) To remaining supernatant, add 236 ul of Type VII Bacterial Amylase (20,000 units/ml; incubate 90 C for 30 min
(9) Add silica slurry (18 g silica to 36 g water); 9 ml to each supernatant
(10) Acidify to pH 3.5 with 2 to 3 drop of 0.1N HCl
(11) Intermittent shaking and let stand 30 min
(12) Centrifuge 3,000×g for 15 min
(13) Remove 9 ml of supernatant (weigh accurately)
(14) Add ethanol, slowly with stirring to 65% ETOH water
(15) Let stand overnight at 40 F
(16) Repeat step 12
(17) Discard supernatant, re-suspend pellet in ethanol, dry
(18) Record weight of dry, water extractable pentosan
(19) Calculate % WE-AX in flour (Wt. flour×solids content)/25 ml=g flour/ml×ml removed for ETOH ppt=total flour, dwb Wt. dry residue/total flour, dwb×100=% WE-AX Sugars Composition of Water-Extractable Pentosan (1) Dissolve dried 15 to 20 mg of WE-AX in 5 ml of water
(2) Add 2 µl (2.28 mg) Trifluoroacetic acid
(3) Autoclave (121 C) for 60 min
(4) Neutralize with 2 drops of 1N NaOH
(5) Filter through 0.45 um PFTE syringe filter
(6) Analyze filtrate for sugars type and amount by HPLC I. HPLC Analysis of Sugars A procedure is described for the determination of fructose, glucose, sucrose, maltose arabinose and lactose in food products and raw materials.

II. Principle

Purified aqueous or aqueous/alcohol sugar extracts are subjected to high performance liquid chromatography whereby the sugars are separated in about 20 minutes. Quantitation is done by comparing sample specific sugar responses with those of standard solutions having an equivalent level of sugars. The method has a precision (relative standard deviation) of 8.8%, 5.1%, 3.3% at 2%, 5.1% and 3.3% of fructose, glucose and sucrose respectively.

III. Apparatus (Equivalent Apparatus May be Substituted)

A. High Performance Liquid Chromatograph (Waters Associates) equipped with Model 6000A solvent delivery system, U6K septumless injector, M R401 (or M R410) differential refractive index detector, u-Bondapak/carbohydrate analysis column (30 cm×4 mm i.d.) and Omniscribe dual pen 10", 10 my recorder (Houston Instruments). For completely automated routine analysis the liquid chromatograph is equipped with a Waters WISP Model 710 B automated sample injector, a Waters Model 720 System Controller and a Waters Model 730 Data Module.

B. Sample Clarification Kit (aqueous). Waters Associates, Milford, Mass.

C. Solvent Clarification Kit, Waters Associates, Milford, Mass.

D. Millipore Filters (aqueous and organic) Types HA and FH respectively, pore size 0.45 mm, Millipore Corporation, Bedford, Mass.

E. Hypodermic syringe, 10 ml.

F. Microsyringe, 25 ml.

G. C18 Sep-Pak Cartridges, Waters Associates, Milford, Mass.

H. Vials, screw capped, 4-dram capacity
I. Explosion-proof centrifuge.
J. Balance, analytical capable of weighing to +/−0.1 mg.

IV. Reagents
Reagents employed were:
A. Acetonitrile, HPLC grade.
B. Acetic acid, glacial.
C. Water, distilled or deionized.
D. Mobile phase, (85+15) v/v acetonitrile/H20. Mix 85 parts acetonitrile with 15 parts water. Filter and degas by swirling under vacuum for about 5 minutes using solvent clarification kit fitted with 0.45 um FH Millipore filter. Vary acetonitrile-water ratio if necessary depending on type of column used.
E. Standard sugar solution. Weigh to the nearest milligram, 1 g each of fructose, glucose, maltose and lactose, and 5 g sucrose. Transfer to a 100 ml volumetric flask, dissolve in water. Make to volume with water, stopper and mix thoroughly. Prepare fresh daily.
F. Petroleum ether, 50-70° C., reagent grade.
G. Ethyl alcohol-absolute.
H. Ethyl alcohol-water mixture (1+1) v/v.

V. Sample Preparation
See Procedure section for individual sample matrices.

VI. Procedure
Use liquid filtrate as is. Add equal volume of alcohol (alcohol-water (1+1) and weigh. Place in 80-85° C. water bath for 25 min. and stir occasionally. Cool to room temperature and add alcohol to original weight. Centrifuge 10 min. at ca 2000 rpm. If very cloudy, recentrifuge portion of extract 5 min. at ca 3500 rpm and pass through an aqueous 0.45 mm filter (type HA).

HPLC Analysis and Determination
The HPLC Analysis and Determination may be performed as follows:
1. Equilibrate the liquid chromatograph by pumping mobile phase at a rate of 2 ml/min. through the column for ca 30 minutes. Open the reference cell valve and allow the mobile phase to pass through the reference cell for ca 2 min. Close the reference valve, allow mobile phase through column until a stable baseline is obtained.
2. Inject sample solution (10-50 ml) into column with flow rate of mobile phase at 2 ml/min. Inject same volume of standard solution that will give peak response+10% of sample peak response. Two injections each of standard and sample solutions are required for good precision. If more than 5 samples are run at one time reinject standard at regular intervals.

VII. Calculation
Calculations may be performed as follows:
A. Measure areas of each sugar peak in sample and standard and calculate % component using the following equation:

$$\% \text{ Component} = (R/R1) \times (C1/W) \times V \times 100$$

where:
R and R1=peak area of sample sugar and standard sugar respectively.
V=ml alcohol-water added to sample=100
W=weight of sample in g
C1=concentration of sugar standard in g/ml The results for the whole grain flour total sugars and WE-AX are shown in Table 7: Whole Grain Flour: Total Sugars and WE-AX

TABLE 7

Whole Grain Flour Total Sugars and WE-AX Results

| Whole Grain Flour Type | Free Sugars (% of flour) | Free Sugars Type (% sugar solids) | Water-Extract Arabinoxylans (wt. % of flour, dwb) | A/X Peak Area Ratio |
|---|---|---|---|---|
| Control RT | | | | 0.79 |
| Control, 70° C. | 0.46 | 49% sucrose 44% glucose 1.7% xylose | 0.98 | 0.47 |
| Pen 3, 70° C. | 0.75 | 31% sucrose 60% glucose 4.5% xylose | 1.65 | 0.54 |
| Iogen 340, 70° C. | 0.75 | 31% sucrose 60% glucose 3.6% xylose | 1.15 | 0.61 |
| G3 SWS RT | | | | 0.60 |

Summary

Xylanase enzymes increase the amount of WE-AX in whole grain flour, from less than 1% dwb to about 1.6% which is indicative of limited digestion of insoluble to soluble bran. The digestion of xylans reduces the solvent binding capacity of the flour and promotes moisture removal and baked flavor generation in the oven. The ratio of arabinose to xylose was about 0.50% to 0.60% typical of pentosan. Enzyme treatment increased the amount of free sugars and may contribute to flavor and color development during cookie baking. Higher amount of free sugar, especially reducing sugars, in flour would have favorable implications with regard to Maillard browning and flavor development.

Example 5

Measurement of the Xylanase Activity in Whole Grain Flour from Enzyme Tempered Wheat The objective of the study was to determine how much active enzyme remained in the whole grain flour after about 1 month storage and how the enzyme activity was distributed on the bran compared to whole flour.

Procedure

Endo-1,4-Beta-Xylanase assay (Method T-XYZ200, Megazyme) procedure was used with the following modifications:
Xylanase enzyme solution was prepared (Pen 10,250 units/g ml) by diluting 40,000 fold. Then 50, 100, 200 and 400 µl aliquots were removed for total assay. Pen III, enzyme activity of the resulting diluent was 256.25 milliUnits/g solution and was used as a standard solution for generating a calibration curve of Abs vs enzyme activity.

The results for measurement of the xylanase activity in the whole grain flours from enzyme tempered wheat are shown in Table 8:

TABLE 8

Xylanase Activity in Whole Grain Flours from Enzyme-Tempered Wheat

| | µl enzyme diluent | µl acetate buffer | Activity units/g | enzyme (mU/g ml) | Absorbance 590 nm |
|---|---|---|---|---|---|
| Pen III (Pen 10, 250 units/g ml) was diluted | 0 | 1000 | 0.25625 0 | 256.25 0 | 0 |
| | 50 | 950 | 0.0128125 | 12.81 | 0.111 |

TABLE 8-continued

Xylanase Activity in Whole Grain Flours
from Enzyme-Tempered Wheat

| | μl enzyme diluent | μl acetate buffer | Activity units/g | enzyme (mU/g ml) | Absorbance 590 nm |
|---|---|---|---|---|---|
| 40000 fold. Then take out 50, 100, 200 and 400 ul for total assay solution 1 ml | 100 | 900 | 0.025625 | 25.62 | 0.158 |
| | 200 | 800 | 0.05125 | 51.25 | 0.282 |
| | 400 | 600 | 0.1025 | 102.5 | 0.613 |

Xylanase activity was measured in flour and in the Bran fraction by extraction of 0.5 g in 50 ml 25 mM NaAc buffer, stirring for 10 min, then clarifying the extraction solution by centrifugation 1,000 g for 10 min. A 500 ul aliquot was removed for assay according to the Megazyme procedure.

Summary and Conclusion

Active xylanase was recovered from the flour after about one month of storage. The amount of xylanase activity was about 5× higher in the bran fraction than that measured in the whole grain flour. This demonstrates that the enzymatic treatment processing of the bran and germ fraction is an effective method for concentrating the applied enzyme in the flour fraction containing the most xylans.

Example 6

Part A. Production of Bepex Turbulizer Treated Bran and Germ with Enzymes. Hydration, and Heat The objective of this Example is to treat the bran and germ by hydration with enzyme followed by stabilization and recombination to whole grain flour to improve texture and flavor when incorporated into a biscuit product. The treatment conditions for non-enzyme treated samples (controls) and enzyme treated samples are shown in Table 9:

TABLE 9

Bran and Germ Treatment Conditions

| Bran Treatment (sample #) | Start moist. (%) | Final Moist. (%) | Bran and Germ Feed Rate (kg/hr.) | Water feed rate/steam feeder rate (kg/hr.)* | Bepex rpm | Mokon temp set (° F.) | Bepex temp (° F.) | Enzyme amount units/g B&G |
|---|---|---|---|---|---|---|---|---|
| Bran water treated (control) (1) | 8.02 | 10.90 | 18.9 | 0.92 | 1,420 | 110 | 116 | 0 |
| Bran PEN III treated (2) | 8.02 | 10.41 | 19.7 | 0.99 | 1,420 | 110 | 116 | 43 |
| Bran stabilized after water treatment (control) (3) | 10.90 | 6.55 | 20 | 2.00 | 1,420 | 310 | 225 | 0 |
| Bran stabilized after PEN III treatment (4) | 10.41 | 4.56 | 20 | 2.15 | 1,420 | 310 | 225 | 43 |
| Bran Iogen 339 treated (5) | 3.44 | 6.82 | 41 | 1.06 | 1,420 | 110 | 116 | 106 |
| Bran Iogen 340 treated (6) | 3.44 | 5.80 | 41 | 1.06 | 1,420 | 110 | 116 | 110 |
| Bran Iogen 341 treated (7) | 3.44 | 7.50 | 41 | 1.06 | 1,420 | 110 | 116 | 188 |

An Acrison volumetric feeder with a 2" ribbon screw (Acrison Feeder Model 10152-H) was used to maintain an average nominal 19.8 kg/hr feed rate of material into the Turbulizer (Turbulizer Model TCJS-8). The configuration for the Turbulizer paddles was set up with the first 3 paddles forward at 45°, then next 5 paddles backward at 45°, and the last 2 paddles at flat as shown in Table 10. The Turbulizer rotor speed was set to 1420 rpm. The bran and germ can have a 40 second retention time in the Turbulizer at the above given setting.

During the bran hydration process (when water, or enzyme solution are added), an atomized stream of water was injected into the Turbulizer through the injection port of the Turbulizer. The Turbulizer was heated with jacket hot oil which was provided through a Mokon pump (Mokon pump speed at 35 rpm, and with 18.5 psi hot oil pressure). Jacket temperatures of 310° F. were used during testing.

During the stabilization process, the direct steam was injected into the Turbulizer through a hollow shaft with 3×2=6 hollow paddles. Steam was generated by heating the water with 60 psi jacket steam, with a water flow rate of 2.00-2.15 kg/hr with water tank pressure at 50 psi, and back steam pressure at 20 psi. The Turbulizer was heated with jacket hot oil which was provided through a Mokon pump (Mokon pump speed at 35 rpm, and with 18.5 psi hot oil pressure). Jacket temperatures of 310° F. were used during testing.

The Turbulizer treated bran and germ was discharged into a sealed 100 lb. plastic bucket, the vacuum pipe was connected to the top of the bucket to remove excess steam.

TABLE 10

Turbulizer Paddle Configuration

| Row | 1 | 2 | 3 | 4 | 5 | 6 | 7 | 8 | 9 | 10 |
|---|---|---|---|---|---|---|---|---|---|---|
| 1 | \ | \ | \ | / | / | / | / | / | — | — |
| 2 | \ | \ | \ | / | / | / | / | / | — | — |
| 3 | \ | \ | \ | / | / | / | / | / | — | — |
| 4 | \ | \ | \ | / | / | / | / | / | — | — |

After Bepex processing, the bran and germ was recombined with remaining flour fractions (break flour+reduction flour) in a 32/68 ratio to form whole grain flour.

Part B: Soft Wheat Flour Quality Assessment for Whole Grain Flour Comprised of Enzyme Hydrated, Stabilized Bran & Germ In this example, the function of whole grain flour made with Bepex processed enzymatically treated bran and germ was compared to the function of untreated whole grain flour.

Solvent Retention Capacity (SRC) serves as a practical test to monitor the function of specific flour components, such as the amount of damaged starch. The SRC assay method used was adapted and modified from AACC method 56-10, according to Example 2. Whole grain flours made with a natural proportion of bran and germ and endosperm produced without enzymatic treatment (controls) and using enzymatic treatment with Iogen 339, Iogen 340, Iogen 341 and PEN III with or without stabilization are listed in Table 11 with their Solvent Retention Capacity (SRC) in water, sucrose, sodium carbonate, and lactic acid:

TABLE 11

SRC Whole Grain Flour and Bran & Germ SRC

| Bran Treatment (Sample #) | Whole Grain Flour SRC | | | | Bran and Germ SRC | | | |
|---|---|---|---|---|---|---|---|---|
| | water | sucrose (20% w/w) | $Na_2CO_3$ | Lactic | Water | sucrose (20% w/w) | $Na_2CO_3$ | Lactic |
| Untreated bran and germ or Untreated WG flour (Control) | 66.33 | 76.12 | 82.49 | 72.47 | 98.15 | 102.93 | 114.34 | 60.81 |
| Water Hydrated bran and germ or Untreated WG flour (Control) (1) | 64.05 | 76.73 | 83.65 | 68.61 | 91.01 | 104.83 | 117.97 | 48.77 |
| Water hydrated and stabilized bran and germ or Untreated WG flour (Control) (3) | 68.73 | 77.29 | 88.63 | 72.14 | 105.64 | 106.59 | 133.53 | 59.80 |
| PEN III Hydrated bran and germ or WG flour (2) | 56.28 | 62.28 | 85.73 | 63.57 | 66.75 | 59.68 | 124.47 | 33.00 |
| PEN III hydrated and stabilized bran and germ or WG flour (4) | 59.08 | 67.93 | 86.19 | 64.81 | 75.50 | 77.34 | 125.90 | 36.89 |
| Iogen 339 (5) | 58.66 | 66.60 | 85.20 | 67.00 | 74.19 | 73.19 | 122.83 | 43.75 |
| Iogen 340 (6) | 58.22 | 67.33 | 86.55 | 67.75 | 72.79 | 75.48 | 127.03 | 46.08 |
| Iogen 341 (7) | 52.48 | 60.21 | 82.18 | 61.17 | 54.87 | 53.22 | 113.36 | 25.51 |

Summary

Enzyme treated whole grain flour/bran & germ has lower absorption, for all four solvents than untreated or water hydrated whole grain flour/bran & germ. Especially significant is the lower absorption of the sucrose solvent, which specifically swells solvent soluble pentosans, as a result of the pentosanase activity applied to the bran/germ.

Example 7

Production of Whole Grain Flour by Using Enzyme Treated Wheat During Wheat Tempering Process in a Flour Mill The objective of this example is to add enzyme (such as PEN III, Iogen 339) into the tempering water as a means of conditioning the bran and germ during the flour milling process for use in biscuits to improve whole grain product texture and flavor.

Part A. Tempering Process:

The tempering is conducted for 4 hours to achieve a 2% by weight final moisture increase compared to incoming wheat having a moisture content of about 12.3% by weight. After enzyme was added, the water pump was turned off.

For the whole grain tempered SWW control, 160 kg water was used for 8000 kg wheat, tempering was started at 7:00 AM, and milling was started at 11:45 AM and completed at 4:50 PM.

For the whole grain tempered SWW with PEN 111, 75.52 kg water was used for 4000 kg wheat, 5 kg PEN III was used, tempering started at 8:05 AM, and milling started at 12:05 PM and completed at 2:05 PM.

For the whole grain tempered SWW with Iogen 339, for 4000 kg wheat, 75.52 kg water, and 5 kg Iogen 339 were used, tempering was started at 10:05 AM, and milling started at 2:05 PM and completed at 4:05 PM.

Part B. Wheat Milling

The objective of this procedure was to produce whole grain flour from wheat kernels tempered as described in part A.

Procedure

The tempered wheat samples were milled at a flour mill. At the end of the mill, there are two final streams: an endosperm stream, and a bran and germ stream. Bran and germ was further ground through a Fekar grinder. Then the two streams were reconstituted to form a whole grain flour, as schematically shown in the flow chart of FIG. 1.

Part C: Whole Grain Flour Functionality Evaluation

In this Example, the baking functionality of whole grain flour made with enzymatically treated bran and germ was compared to the baking functionality of untreated whole grain flour. Whole grain flours made with a natural proportion of bran and germ and endosperm are listed in Table 12 along with their whole grain flour particle size distributions:

TABLE 12

Whole Grain Flour Particle Size Distribution

| Sieve No. | Whole grain flour control | Whole grain flour with Iogen 339 | Whole grain flour with Pen III |
|---|---|---|---|
| 40 | 0.14 | 0.2 | 0.06 |
| 50 | 1.38 | 1.26 | 1.14 |
| 60 | 1.42 | 1.52 | 1.34 |
| 70 | 1.5 | 1.7 | 1.38 |

TABLE 12-continued

Whole Grain Flour Particle Size Distribution

| Sieve No. | Whole grain flour control | Whole grain flour with Iogen 339 | Whole grain flour with Pen III |
|---|---|---|---|
| Rotap + 80 | 1.36 | 1.56 | 1.3 |
| Rotap + 100 | 1.44 | 1.68 | 1.32 |
| Rotapthrough100 | 92.3 | 91.18 | 92.88 |
| Total | 99.54 | 99.1 | 99.42 |

The method for determining the particle size distributions was adapted from the ASTA 10.0 RoTap Shaker method with modifications and adaptations as shown below. The method is applicable to a wide variety of products and ingredients which uses a uniform mechanical action to assure accurate, dependable results. The shaker reproduces the circular and tapping motion used in hand sieving. The apparatus and method for the particle size distribution determination are:

Whole Grain Flour Particle Size Distribution Determination

Apparatus
1. Tyler RoTap electric testing sieve shaker (Fisher Scientific), with automatic timer.
2. U.S. Standard Sieves, #20, #35, #40, #50, #60, #80, #100, bottom separator pan, and cover.
3. Weigh balance, accurate to 0.1 g.
4. Brushes for cleaning screens.
5. Silicon powder flow aid (Syloid #244, W.R. Grace & Co.).

Procedure
1. Use clean, thoroughly dried, tared sieves.
2. Accurately weigh the designated size of sample (to nearest 0.1 g) into a 250 ml or 400 ml beaker.
3. Tare the appropriate sieves and bottom pan individually.
4. Stack the sieves on the shaker with the coarsest opening at the top and increase in fineness until the finest opening is at the bottom. Place a bottom pan underneath.
5. Transfer the sample quantitatively from the beaker to the top sieve.
6. Place the sieve cover on top, then the shaker plate, circular frame and lower the tap arm.
7. Set the timer for 5 minutes.
8. After completion of shaking, remove sieves from RoTap and carefully weigh each sieve and the pan separately.

Calculations
1. Using one sieve a. $\% \text{ on} = \frac{(\text{wt. of sieve} + \text{material}) - \text{wt. of sieve}}{\text{wt. of sample}} \times 100$ b. $\% \text{ thru} = 100 - \% \text{ on}$ 2. Using three sieves or more
   Sieve A ($S_a$), coarse, top
   Sieve B ($S_b$), medium, middle
   Sieve C ($S_c$), fine, bottom
   Etc.

a. $\% \text{ on}_a = \frac{(\text{wt. of } S_a + \text{material}) - \text{wt. of } S_a}{\text{wt. of sample}} \times 100$ b. $\% \text{ on}_b = \frac{(\text{wt. of } S_b + \text{material}) - \text{wt. of } S_b}{\text{wt. of sample}} \times 100$ c. $\% \text{ on}_c = \frac{(\text{wt. of } S_c + \text{material}) - \text{wt. of } S_c}{\text{wt. of sample}} \times 100$ 3. The amount of silicon powder flow aid added to the sample should be subtracted from the weight in pan before doing the above calculation.
4. The sum of the percentages on all the screens (plus pan) should be equal to or closely approximate 100%

The cookie test baking method and the test formulas used in baking to evaluate the baking functionality of the whole grain flours were according to the AACC 10-53 Cookie Test Baking Method:

AACC 10-53 Cookie Test Baking Method

The AACC 10-53 Cookie Test Baking Method was designed at Nabisco Biscuit Company for evaluation of ingredient functionality and predictive correlation between sensory and mechanical texture analysis (mechanical texture analysis by TAXT2 Texture analyzer 3-point bend or puncture test). The test is an improvement over AACC 10-52 Sugar-Snap Cookie Test Baking Method as confirmed by USDA Soft Wheat Quality Lab (Wooster Ohio). The AACC 10-53 test was adopted as the official method of the American Association of Cereal Chemists after collaborative testing by the Soft Wheat Quality Committee in 1992. The equipment, cookie dough composition, mixing procedure, baking procedure, measurement procedure, etc. used in the test are:

Equipment

Moisture Analyzer, disposable sample pans for determination of flour moisture.

Digital Thermometer (Omega model 872A) with thermocouple

C-100 Hobart Mixer with 3-quart mixing bowl and paddle.

National Test Baking Oven.

Aluminum cookie sheet—26 cm width×30 cm length with 2 gauge bars 12 mm width×30 cm length×7 mm height.

Cookie cutter (60 mm internal diameter).

Rolling pin with sleeve (sleeve lines run along length of pin).

Spatulas, brown absorbent paper, aluminum foil, plastic beakers

TA-XT2 Texture Analyzer Optional test for dough rheology—special pan dimensions with 10 cm, length 10.5 cm, height 3.2 cm Standard Formulation AACC 10-53 Single Batch to Make 4 Test Cookies:

| Stage-1 | |
|---|---|
| Nonfat dry milk powder | 2.25 g |
| Salt | 2.81 g |
| Sodium bicarbonate | 2.25 g |
| Vegetable shortening (Sans Trans 39, Cargill) | 90.00 g |

| Stage-2 | |
|---|---|
| Ammonium bicarbonate | 1.13 g |
| High fructose corn syrup; 42% fructose, 71% solids | 3.38 g |
| Water* | 49.50 g |

| Stage-3 | |
|---|---|
| Flour (at 13% moisture) | 225.00 g |

Measure the flour moisture content on each day of baking; adjust levels of flour and water to compensate for deviations from 13% moisture content:

Record flour moisture content and insert as FM into equation to calculate actual flour weight per batch Actual flour weight (g)=87/(100−FM)*225 g Record actual flour weight per batch and insert as AFW in equation to calculate actual weight of added water per batch Actual added water (g)=49.5 g+225−AFW*225 g.

General Mixing Procedure:
Stage-1: blend dry ingredients (nonfat dry milk, salt, bicarbonate, sugar)
Add fat
Mix in Hobart mixer 3 minutes at low speed; scrape paddle and sides of bowl after each minute of mixing.
Stage-2: dissolve ammonium bicarbonate in water; add high fructose corn syrup.
Add total solution to stage-1;
Mix 1 min at low speed, scraping bowl and paddle after each 30 sec.
Mix 2 min at medium speed, scraping bowl and paddle after each 30 sec.
Stage-3: Add flour, fold into liquid mixture 3 times. Mix 2 minutes at low speed scraping paddle and bowl after each 30 seconds.

Baketime Determination:
The baketime is defined as the time required to produce a weight loss of 13.85% during baking of the formulation at 400° F.

To measure Baketime:
Bake formulation at 400° F. for 10, 11, 12, 13 min and for some whole grain flours up to 16 minutes, weighing the bake sheet+cookies after each minute interval.
Plot % weight loss during baking vs. bake time in minutes.
Interpolate baketime required to achieve 13.58% weight loss.

Baking Specifications:
Preheat oven to 400° F. (202° C.).
Record the weight of the cold cookie sheet.
Place cookie sheet in oven for standard baketime; record weight of hot sheet.

Procedure for Preparation of 4 Dough Blanks for Cookie Test Baking:
Portion four 60 g pieces of dough with minimum deformation and place on cookie sheet. Lay rolling pin across gauge bars of cookie sheet allowing weight of pin to compress the dough pieces without additional compressive force. Pick up rolling pin and place on gauge bars at end of cookie sheet, and roll only once away from you. Cut cookies with 60 mm cutter, and carefully lift scrap dough with small spatula. Lift cutter straight up to avoid horizontal distortion.
Record the weight of dough blanks and cookie sheet.
Place dough blanks and cookie sheet in the oven in the direction of sheeting. Bake cookies at 400° F. for predetermined bake-time.

Weigh the cookie sheet with cookies on it immediately upon removal from the oven. Carefully remove cookies from sheet with flat spatula and place flat on brown paper in the same direction in which they were sheeted and baked.

Geometry Measurements (Taken when Cookies are Cooled, at Least 30 Minutes):
Width-diameter perpendicular to direction of sheeting: Lay 4 cookies in a row with rolling-pin-sleeve lines parallel to length of meter stick. Record the measurement in cm.
Length-diameter parallel to sheeting: Rotate cookies 90° so rolling-pin-sleeve lines are perpendicular to meter stick. Record measurement in cm.
Stack Height: Stack 4 cookies and place stack on side between flat guides. Record the height.

Solvent Retention Capacity (SRC)
Solvent Retention Capacity (SRC) serves as a practical test to monitor the function of specific flour components, such as the amount of damaged starch. The SRC assay method used was adapted and modified from AACC method 56-10, according to Example 2 which uses a hand shaking method, to a Shakematic method which employs machine shaking. Moisture content, as determined by the Computrac technique, for the whole grain flour control, for the whole grain flour with Iogen 339, and for the whole grain flour with PEN III was 13.55%, 13.34%, and 13.43% by weight, respectively. Two replications were employed and the resulting means for the SRC are shown in Table 13.

In Table 13, are shown the SRC and baking results for control whole wheat flour and for enzyme treated wheat flour, where the enzyme treatment was initiated during wheat tempering. Included in Table 13 are: (1) solvent retention capacity of the whole grain flour for water, sucrose, sodium carbonate and lactic acid solvents, (2) cookie width, cookie length and stack height, and 3) cookie weight percentage loss during baking:

TABLE 13

SRC and AACC 10-53 Cookie Baking Results of Whole Grain Flour

| | Cookie baking | | | | Flour SRC % | | | |
|---|---|---|---|---|---|---|---|---|
| Enzyme type | % Wt. loss baking | Width (cm) 4 | Length (cm) 4 | Stack height (cm) | Water | sucrose | Sodium carbonate | Lactic acid |
| Whole grain flour control | 6.33 | 29.3 | 29.4 | 4.7 | 76.76 | 89.17 | 96.94 | 86.85 |
| Whole grain flour with Iogen 339 | 5.61 | 29.8 | 28.9 | 4.5 | 75.87 | 87.48 | 99.99 | 84.07 |
| Whole grain flour with PEN III | 6.37 | 29.3 | 29.4 | 4.5 | 71.79 | 83.97 | 98.28 | 77.48 |

Summary

Enzyme treated whole grain flour has a similar particle size distribution as the untreated whole grain flour. The enzyme treated whole grain flour demonstrates baking qualities similar to untreated whole grain flour. Iogen 339 and PEN III treated whole grain flours have a lower, or reduced SRC (water, sucrose, and lactic acid) and lower water absorption compared to the SRC of the whole grain flour control flour.

Part D: Sensory Evaluation of 100% Whole Grain Cracker

Objective(s):

In this Example the objective is to assess the impact on the sensory profile of a whole wheat (WW) cracker made with whole wheat flour made from enzyme tempering.

Samples

The whole wheat cracker samples employed were:
1. 100% WW (G3 SWS) (Control)
2. 100% WW (G3 SWS) with Iogen 339 Enzyme Treated Bran
3. 100% WW (G3 SWS) with PEN III Enzyme Treated Bran All samples were produced in a pilot plant and evaluated by a descriptive panel at about 4 weeks of age.

Methodology

The descriptive panel evaluated the products quantitatively for flavor and texture attributes. Samples were evaluated blind and labeled with 3-digit codes. The data was analyzed with Senpaq (v. 5.0). Only attributes with statistically significant differences among the products are reported ($p \leq 0.05$).

Results

Figure 3:
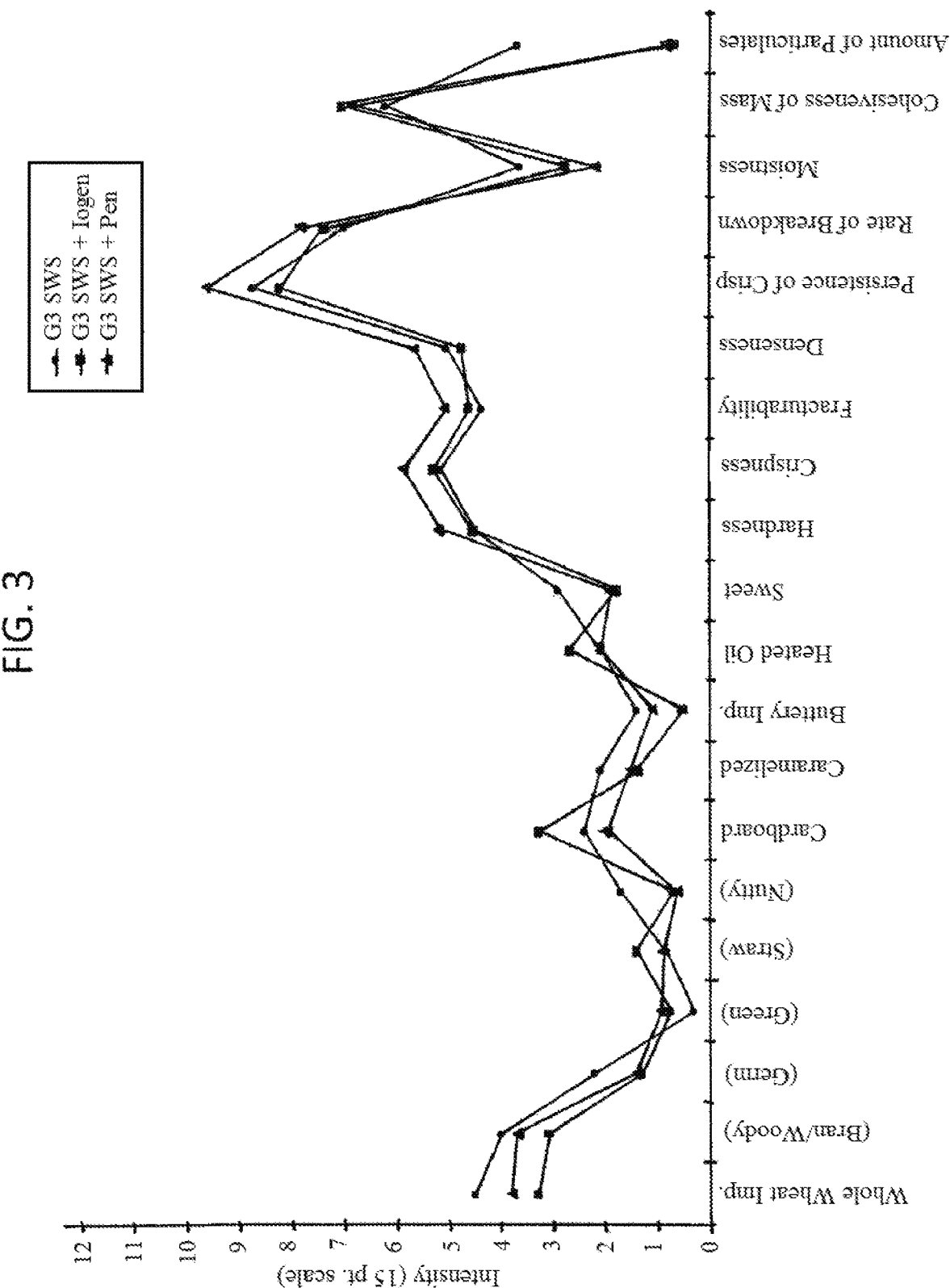
FIG. 3 shows a graph of the impact on the sensory profile of a whole wheat cracker containing whole wheat flour made using xylanase and pentosanase enzymatic treatment initiated during tempering of the whole grains.

The effects of enzyme treatment initiated during tempering on the flavor and texture attributes which were statistically different are shown in Table 14 and graphically presented in FIG. 3:

TABLE 14

Effects Of Enzyme Treatment On Flavor And Texture Attributes

| Iogen vs. Control | Pen vs. Control | Iogen vs. Pen |
|---|---|---|
| Iogen was/had . . . | Pen was/had . . . | Iogen was/had . . . |
| Less whole wheat imp. | Less whole wheat imp. | Less whole wheat imp. |
| Less bran/woody | Less bran/woody | Less bran/woody |
| Less germ | Less germ | More straw |
| More green | More green | More cardboard |
| More straw | Less nutty | Less buttery imp. |
| Less nutty | Less caramelized | More heated oil |
| More cardboard | Less sweet taste | Less hard |
| Less caramelized | More hard | Less crisp |
| Less buttery imp. | More crisp | Less fracturable |
| More heated oil | More fracturable | Less dense |
| Less sweet taste | More dense | Less persistence of crisp |
| Less persistence of crisp | More persistence of crisp | Slower breakdown |
| Faster breakdown | Faster breakdown | More moist |
| Less moist | Less moist | |
| More cohesive of mass | More cohesive of mass | . . . than PEN III. |
| Fewer particulates | Fewer particulates | |
| . . . than the Control. | . . . than the Control. | |

Summary

Using enzymes resulted in decreases in the whole wheat-related attributes (overall whole wheat impression, bran/woody, germ, nutty, amount of particulates) while increasing the green note seen more often with white flour. The Iogen enzyme had more of an effect on reducing the whole wheat notes than the Pen. Additionally, the Pen enzyme resulted in the texture of the product being harder/tougher in nature. The samples did not demonstrate statistical significance for the following attributes (and were left off FIG. 3 for simplicity): raw, cooked, baked, scorched, starchy, diacetyl, sweet cream butter, baking soda, salt, sour, bitter, astringent, toothpacking, oily mouthcoating.

We claim:

1. A method of treating bran and germ for the production of whole wheat flour and baked goods containing whole wheat flour, the method comprising:
    subjecting whole wheat kernels or grains having bran and germ to a first enzymatic treatment, the first enzymatic treatment comprising tempering the whole wheat kernels or grains in a mixture of water and an enzyme composition comprising a xylanase and/or a pentosanase to hydrate the bran and germ and coat the kernels or grains with the enzyme composition;
    grinding the tempered wheat kernels or grains to obtain a ground bran and germ fraction and an endosperm fraction;
    separating the ground bran and germ fraction from the endosperm fraction; and
    subjecting the ground bran and germ fraction to second enzymatic treatment with the enzyme composition at a temperature of about 70° C. to about 90° C.,
    wherein the first and second enzymatic treatments convert insoluble fiber of the bran and germ into soluble fiber and sugars and reduce the water retention capacity of the bran and germ fraction, and at least a portion of the enzyme composition is retained in the ground bran and germ fraction following the second enzymatic treatment.

2. A method of treating bran and germ as claimed in claim 1 wherein the enzyme composition does not contain enzyme activity from amylases or proteases.

3. A method of treating bran and germ as claimed in claim 1 wherein the xylanase and/or pentosanase is derived from *Trichodenna reesei*.

4. A method of treating bran and germ as claimed in claim 1 wherein the insoluble fiber of the bran and germ is converted into water soluble fiber and sugars comprising xylose, and arabinose.

5. A method of treating bran and germ as claimed in claim 1 wherein the water retention capacity of the bran and germ is reduced to less than about 80% and the water retention capacity of the whole wheat flour is reduced to less than about 75% by the first and second enzymatic treatments.

6. A method of treating bran and germ as claimed in claim 5 wherein the water retention capacity of the bran and germ is reduced to less than about 75% by the first and second enzymatic treatments.

7. A method of treating bran and germ as claimed in claim 3 wherein the enzyme composition comprises xylanase and the xylanase is a heat stable xylanase comprising a stabilized liquid xylanase having a xylanase enzymatic activity of about 0.5 XU xylanase activity per gram of the composition to about 50 XU xylanase activity per gram of the composition.

8. A method of treating bran and germ as claimed in claim 1 wherein the first and second enzymatic treatments are conducted at a pH of about 5 to about 9.

9. A method of treating bran and germ as claimed in claim 1 wherein the first and second enzymatic treatments increase water extractable arabinoxylans content to about 1% by weight to about 10% by weight, based upon the weight of the bran and germ.

10. A method of treating bran and germ as claimed in claim 1 wherein the tempering of the whole wheat kernels or grains with the enzyme composition is at ambient temperature.

11. A method of treating bran and germ as claimed in claim 1 wherein the first and second enzymatic treatments avoid substantial gelatinization of starch in the bran and germ, and the water retention capacity of the whole wheat flour is reduced to less than about 60% by the first and second enzymatic treatments.

12. A method of treating bran and germ as claimed in claim 1 wherein the moisture content of the bran and germ during the first and second enzymatic treatments is from about 5% by weight to about 30% by weight.

13. A method of producing whole wheat flour and baked goods containing whole wheat flour comprising: combining the enzymatically treated bran and germ of claim 1 with the endosperm fraction to obtain a whole wheat flour.

14. A method of producing whole wheat flour and baked goods containing whole wheat flour as claimed in claim 13 wherein the water retention capacity of the whole wheat flour is reduced to less than about 60% by the first and second enzymatic treatments.

15. A ground bran and germ fraction or baked good obtained by the method of claim 1.

16. A whole wheat flour or baked good obtained by the method of claim 13.

17. A baked good as claimed in claim 16 which is a cracker, or a biscuit or cookie.

18. A whole wheat flour comprising: a heat stable xylanase-treated and/or pentosanase-treated bran and germ fraction which comprises water soluble fiber, xylose, and arabinose, and an endosperm fraction, the whole wheat flour having a water retention capacity of less than about 60%, and a degree of starch gelatinization of less than 25% as measured by differential scanning calorimetry (DSC).

* * * * *